United States Patent [19]
Rao et al.

[11] Patent Number: 6,031,638
[45] Date of Patent: Feb. 29, 2000

[54] IMAGE FORMING DEVICE

[75] Inventors: Gururaj Rao; Hiroki Kanno, both of Yokohama, Japan

[73] Assignee: Kabushiki Kaisha Toshiba, Kawasaki, Japan

[21] Appl. No.: 08/877,209

[22] Filed: Jun. 17, 1997

[30]      Foreign Application Priority Data

Jun. 19, 1996  [JP]  Japan .................................. 8-158203

[51] Int. Cl.[7] .................................................. H04N 1/04
[52] U.S. Cl. ......................... 358/474; 358/519; 358/505
[58] Field of Search .................................. 358/443, 444, 358/448, 513, 514, 519, 518, 530, 482, 483, 474, 471; 382/234, 254, 260, 304; 347/41, 42, 180, 181, 182; 348/281, 282, 283; 399/151

[56]                References Cited

U.S. PATENT DOCUMENTS

| | | | |
|---|---|---|---|
| 4,928,158 | 5/1990 | Kimata ..................... | 257/231 |
| 5,285,295 | 2/1994 | Kai et al. ................. | 358/482 |
| 5,475,508 | 12/1995 | Maeshima et al. ...... | 358/514 |
| 5,499,111 | 3/1996 | Sato et al. ............... | 358/455 |
| 5,638,107 | 6/1997 | Curry ....................... | 347/234 |
| 5,650,862 | 7/1997 | Shimizu et al. ......... | 358/448 |
| 5,701,505 | 12/1997 | Yamashita et al. ...... | 358/514 |
| 5,757,520 | 5/1998 | Takashima ............... | 358/513 |
| 5,764,377 | 6/1998 | Nacman et al. .......... | 358/444 |
| 5,774,234 | 6/1998 | Miyamoto et al. ...... | 358/451 |
| 5,784,101 | 7/1998 | Hasegawa ................ | 348/282 |
| 5,784,180 | 7/1998 | Sakai et al. .............. | 358/501 |

FOREIGN PATENT DOCUMENTS

| | | |
|---|---|---|
| 0717369A2 | 6/1996 | European Pat. Off. . |
| 5-167842 | 7/1993 | Japan . |

*Primary Examiner*—Edward L. Coles
*Assistant Examiner*—Joseph R. Pokrzywa
*Attorney, Agent, or Firm*—Foley & Lardner

[57]                ABSTRACT

An image input section reads an image on a document, and simultaneously output image data of a plurality of pixels. An input image converting section generates second image data continuing in a sub-scanning direction based on image data. An image processing section provides a predetermined image processing to the image data to generate third image data. An image output section forms a duplicating image of an image on the document by simultaneously using a plurality of laser devices corresponding to each pixel based on the third image data. Image data in which a plurality of pixels is simultaneously input is arrayed and adjusted to be applied to a multi-beam output. As a result, an image processing for obtaining a high quality of the duplicating image can be performed at high speed.

5 Claims, 20 Drawing Sheets

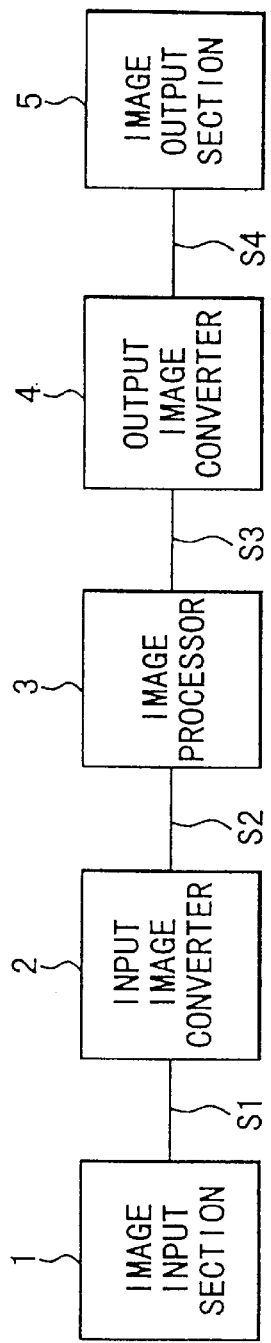
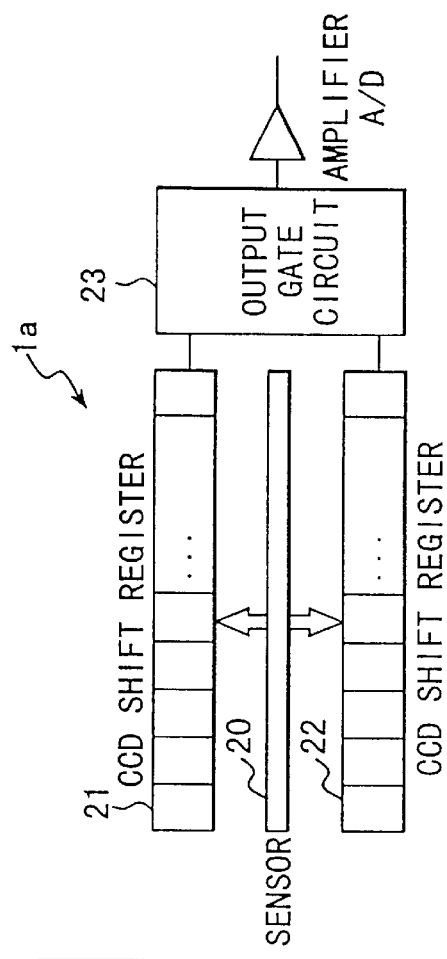
FIG. 1
FIG. 2
FIG. 3

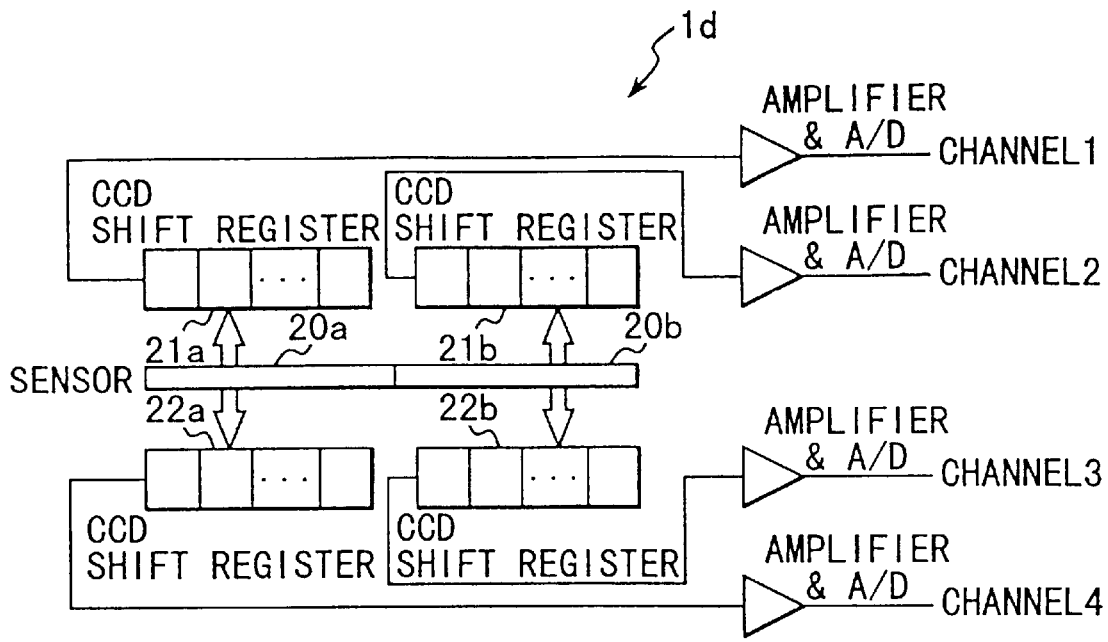
F I G. 9
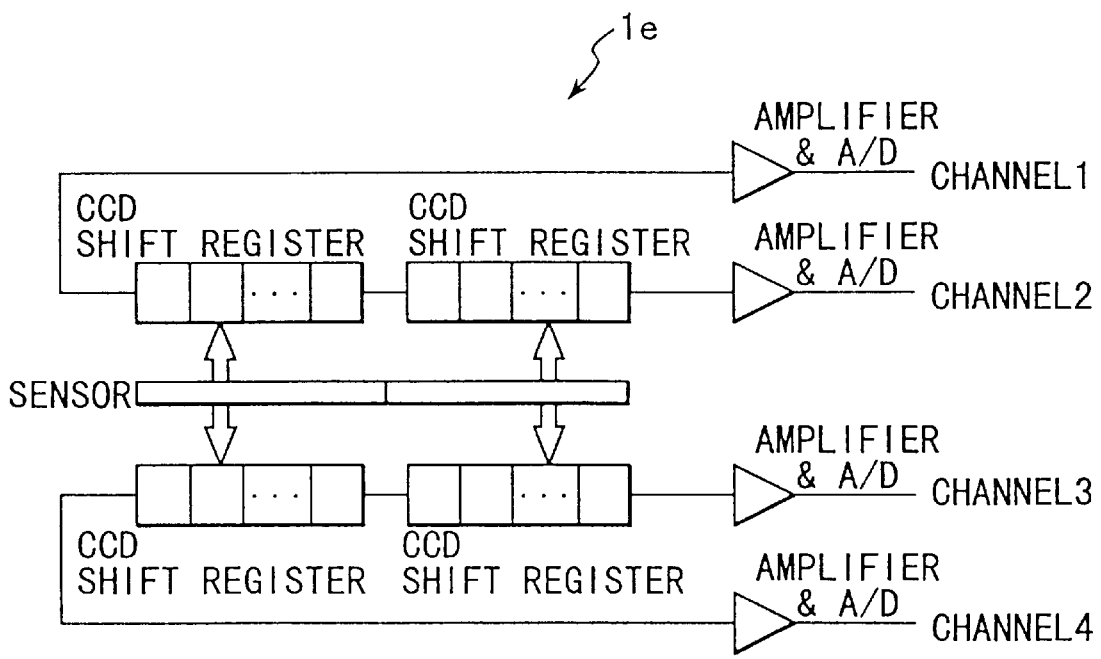
F I G. 11

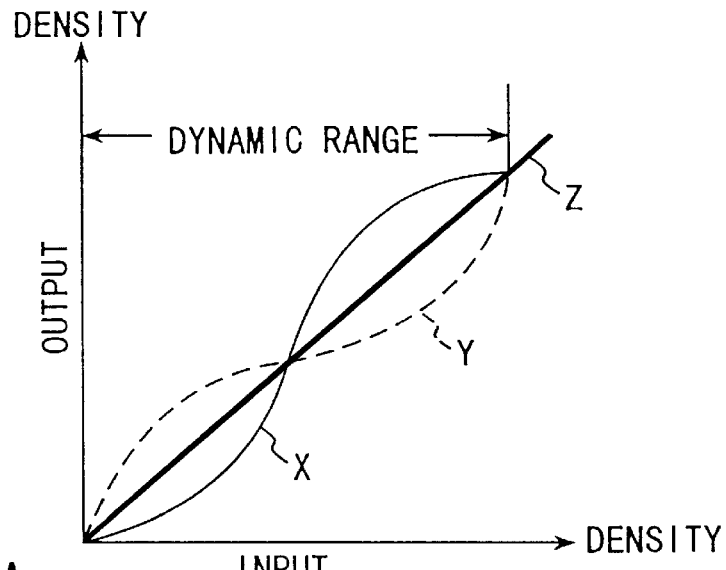
FIG. 23A
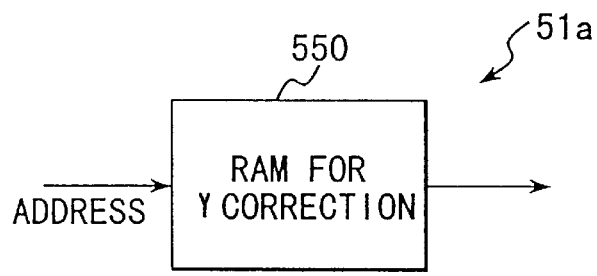
FIG. 23B
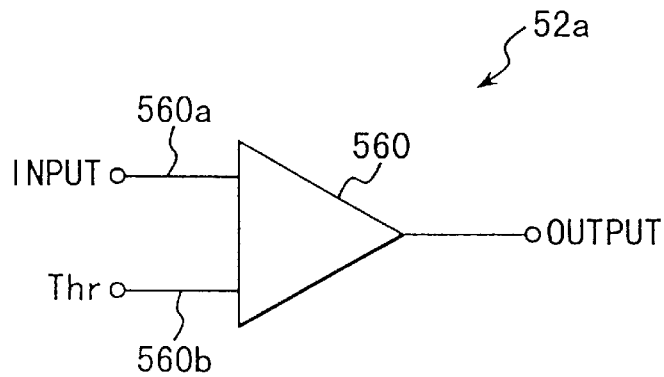
FIG. 24A
| 205 | 230 | 255 |
| --- | --- | --- |
| 175 | 15 | 45 |
| 135 | 105 | 75 |
FIG. 24B

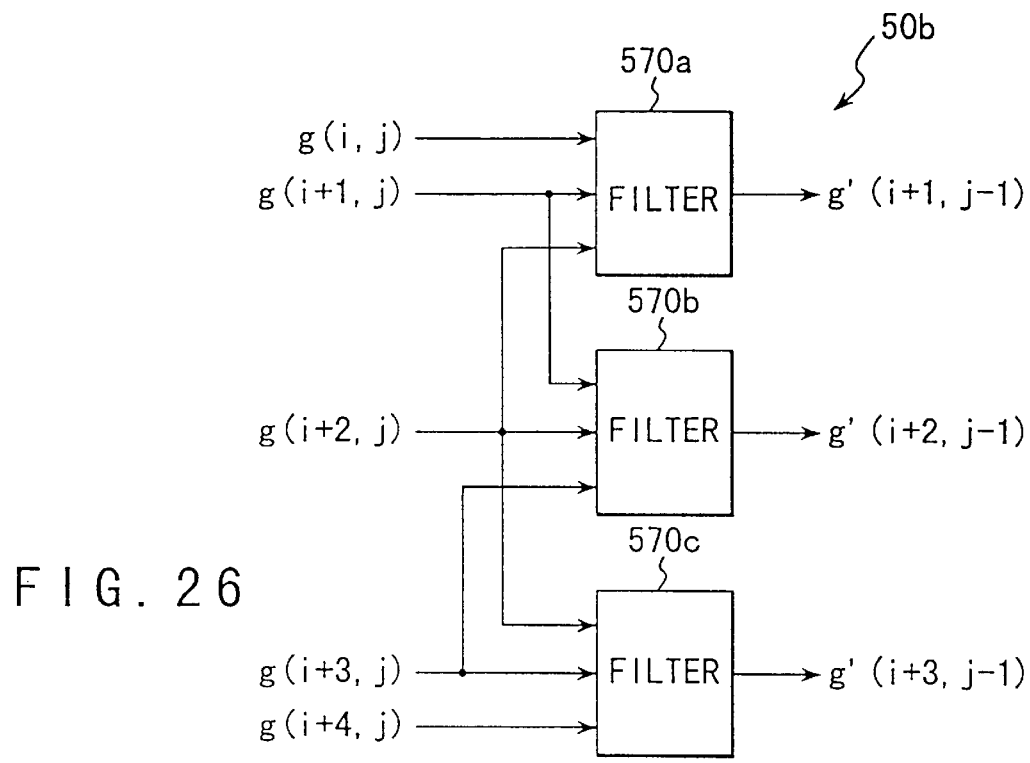
F I G. 2 6
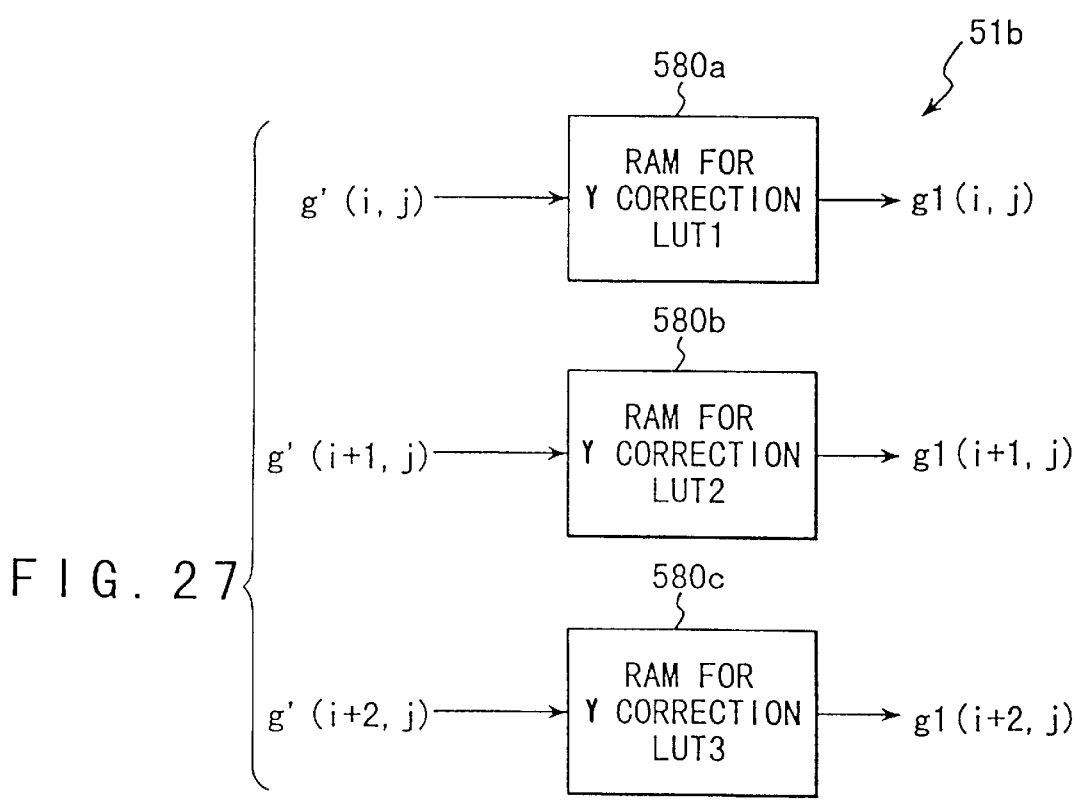
F I G. 2 7

IMAGE FORMING DEVICE

BACKGROUND OF THE INVENTION

The present invention relates to an image forming device, in which an image read from an original document to be processed is generated in units of a plurality of pixels, and a predetermined image process is provided to the image in parallel for the plurality of pixels, forms a duplicate image through a multi-beam output, and to an image processing method which the image forming device applies.

Conventionally, in an image forming device such as a facsimile device, an original document to be processed is read by a line sensor such as a CCD. Then, an image process, which adapts to the properties of an input/output device or the feature of the document, is provided to image data by a pixel unit. Thereby, both gradation and resolution of the image are improved. In this case, image data is synchronized with an image clock and input by a raster form. Moreover, image data, which is image-processed, is reproduced on a photosensitive drum by a laser writing and transferred on paper by an electronic photograph process. Thereby, the image is duplicated.

On the other hand, in a case of a high-speed copy reproduction, the rotation speed of a polygon mirror, which scans the photosensitive member by a laser beam, and a drive signal frequency of the laser must be increased in order to execute a duplication. However, there are limitations in the rotation speed of the polygon mirror such as power consumption of a motor, a laser pulse width modulation rate. To solve such a problem, there is proposed a system in which an image is written on a photosensitive member at high-speed by a multi-beam system for simultaneously scanning a plurality of lines by a plurality of lasers.

In the case of using the signal output system, which corresponds to the multi-beam, for simultaneously outputting image data of the plurality of lines, there was a problem as explained below:

Specifically, it is impossible to provide a predetermined image process to image data, which is input from an image input device such as a line sensor in a raster form in unit of a plurality of pixels. Moreover, a multi-beam output cannot be executed. In other words, image data input from the line sensor must be arrayed.

Also, it is necessary to select whether image data, which is input in the raster form in units of pixels from the image input device such as the line sensor, is simultaneously processed in parallel or processed at a high frequency in serial. However, there is a limitation in the high frequency image data process, because of the processing speed of the device. Therefore, it has been highly desired that the image processing is provided to the plurality of lines simultaneously in order to perform the high speed processing.

In the case of providing simultaneously parallel processing to image data, which is input in units of the plurality of lines in the raster form from the image input device such as the line sensor, there is a problem in which an image processing for obtaining a high quality of a duplicating image, such as a well-known error diffusion processing, cannot be performed.

Moreover, at the time of a multi-beam output, there is possibility that writing characteristics of the respective lasers will differ from each other due to variation of the lasers. As a result, correction between the beams is needed.

BRIEF SUMMARY OF THE INVENTION

An object of the present invention is to provide an image forming device, which can rearrange and adjust image data simultaneously input in a form of a plurality of pixels in order to adapt to a multi-beam output, and which can perform image-processing at high speed, and is to provide its image processing method.

In order to achieve the above object, according to one aspect of the present invention, there is provided an image forming device comprising:

image reading means for reading an image on an original document;

image processing means for providing a predetermined image processing to the image read by the image reading means to generate first image data;

converting means for rearranging the positions of the respective pixels of the first image data generated by the image processing means to be converted to second image data of a plurality of lines; and image forming means for forming a duplicating image of an image on the document by use of a plurality of beams corresponding to image data of each line based on the second image of the plurality of lines converted by the converting means.

According to another aspect of the present invention, there is provided an image forming device comprising:

image reading means for reading an image on an original document;

converting means for rearranging the positions of the respective pixels of the first image data generated by the image processing means to be converted to second image data of a plurality of lines;

image processing means for providing a predetermined image processing to the second image data of the plurality of lines converted by the converting means in parallel to generate third image data; and image forming means, including a plurality of beam generating means to correspond to each of image data of each line based on the image data of the plurality of lines generated by the image processing means, for forming a duplicating image of the image on the document by use of the beam generating means.

The image reading means comprises line sensor such as CCD, and has a predetermined number of output channels. The predetermined number of pixels of a main scanning direction of the image is simultaneously output from the predetermined number of output channels.

The converting means simultaneously outputs the predetermined number of pixels continuing in a sub-scanning direction of the image based on the predetermined number of pixels simultaneously output in the main scanning direction.

The image processing means has a plurality of filters for simultaneously filtering each pixel output from the converting means. Each filter means filters a target pixel by multiplying peripheral pixels adjacent to the target pixel in the read image by a predetermined filter coefficient and by adding all multiplying results.

The image processing means includes a plurality of γ correcting means for individually correcting a non-linear characteristic between input and output signals of each of the plurality of beam generating means.

The image processing means includes a plurality of error diffusion means for binarizing each pixel output from the simultaneously outputting means, for delaying at least one of the pixels simultaneously output, and for diffusing a binary conversion error generated when making the target pixel binary to peripheral pixels adjacent to a target pixel in the second image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view schematically showing the structure of an image forming device according to an embodiment of the present invention;

FIG. 2 is a view explaining one example of a document reading section;

FIG. 3 is a view showing an image reading operation by a conventional CCD sensor;

FIG. 9 is a view showing the other structure of the image input section of FIG. 1, that is, a case of outputting four-channel image data;

FIG. 11 is a view showing the other structure of the image input section of FIG. 1, that is, a case of outputting four-channel image data;

FIG. 16 is a timing chart for explaining an operation of the input image converting section of FIG. 15;

FIG. 18 is a timing chart for explaining an operation of the input image converting section of FIG. 17;

FIG. 19 is a timing chart for explaining an operation of the input image converting section of FIG. 17;

FIGS. 23A and 23B are views explaining the structure of a γ correcting section and a processing operation, respectively;

FIGS. 24A and 24B are views explaining the structure of a gradation processing section and a processing operation, that is, a binarizing process;

FIG. 26 is a view showing the structure of the filtering section for providing a filtering processing image data of a plurality of lines in parallel;

FIG. 27 is a view showing the structure of the γ correcting section for providing a γ correction to image data of a plurality of lines in parallel;

DETAILED DESCRIPTION OF THE INVENTION

Figure 4:
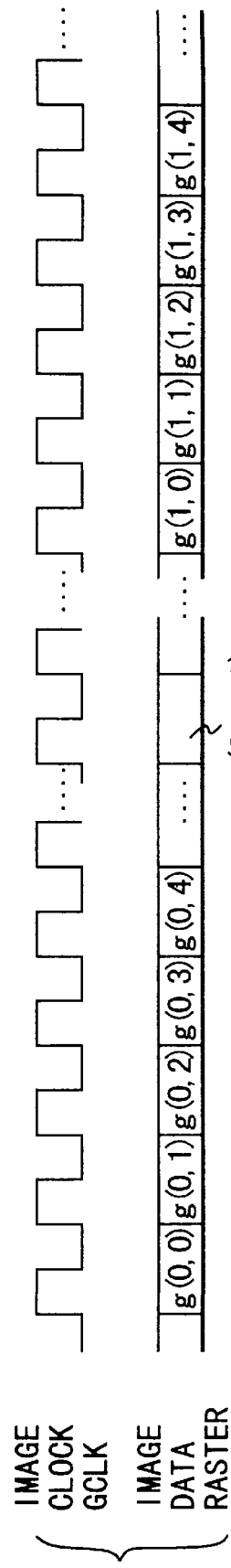
FIG. 4 is a view showing one example of image data output from the CCD sensor of FIG. 3.

An embodiment of the present invention will now be described with reference to the accompanying drawings.

FIG. 1 schematically shows the structure of the image forming device of the present invention, that is, an example of a copy machine for forming a duplicate image of a read original image. The outline of the operation will be explained as follows. An image is read from the original document to be copied by an image input device 1. An image processor 3 provides an image process such as filtering to read first image data S1. Then, the processed image is reproduced by an image output section 5 such as an electrophotographic printer.

Specifically, in FIG. 1, the image input section 1 reads the image from the original document to be copied. The image input section 1 comprises e.g., a CCD line sensor, and an analog/digital converter (A/D converter). More specifically, the image input section 1 reads reflection data or density of the image on the document in units of a plurality of pixels continuing in a main scanning direction. Then, the image input section 1 synchronizes these reflection data or density with a transfer clock, and outputs one pixel or simultaneously outputs a plurality of pixels as numeral data (first image data S1) (e.g., density of one pixel is shown by 8 bits).

An input image converter 2 converts first image data S1 of a plurality of channels supplied from the image input section 1 to adapt to a process system of an image processor 3 of a next stage, and outputs converted second image data S2. In a case where the image processor 3 processes the pixels in the same order as the input order of first image data S1, the input image converter 2 directly outputs first image data S1 supplied from the input section 1 to the image processor 3 as second image data S2.

The image processor 3 processes second image data S2 to adjust to the characteristic of the I/O device or the feature of the copying document in order to obtain a high quality image reproduction of the document. After processing, the image processor 3 outputs third image data S3.

An output image converter 4 converts the order of the third image data S3 to adapt to an output system of an image output section 5, and outputs fourth image data S4. If the output order of the output system of the image processor 3 is the same as the output order of an image output section 5, the output image converter 4 directly outputs third image data S3 to the image output section 5 as fourth image data S4.

The image output section 5 writes fourth image data S4, serving as an image, on a photosensitive drum by a laser scanning. Thereafter, the image is transferred onto paper by a process such as an electrophotography, etc., so as to copy the document. In a case of a low-speed copy machine, input image data is written on the photosensitive drum every one line in a main scanning direction with one laser. In a case of a high-speed copy machine (the embodiment of the present invention), the input pixels for a plurality of lines are simultaneously written with a plurality of lasers (this is called as a multi-beam output). The following will mainly explain the image processor in consideration of the multi-beam output system.

Each section of FIG. 1 will be specifically explained.

First, the image input section 1 of FIG. 1 will be explained.

FIG. 2 is a view for explaining a method for reading the document to be copied. For example, the CCD line sensor as image input section 1 samples pixels of each line with a predetermined resolution (e.g., 600 dpi), and sequentially outputs image data read in a line unit of pixels in synchronous with an image clock. As shown in FIG. 2, for example, pixel g (i, j) is j-th pixel data in the main scanning direction. In this case, i-th line in the sub-scanning direction is read in the main scanning direction by the CCD sensor to be sampled and quantized (hereinafter called digitization).

In the well-known raster scanning, the image is scanned left to right (main scanning direction) and from up to down (sub-scanning direction). For example, the CCD line sensor scans the pixels of the image in order of j=0, 1, 2, . . . n in each scanning line in synchronous with the image clock and scans the lines in order of i=0, 1, 2, . . . m in the sub-scanning direction, so as to output image data g (i, j) in the main scanning direction.

FIG. 3 shows the structure of the image input section 1a using the general CCD line sensor. An electrical charge, which corresponds to reflected light of the document which is made incident upon a photosensitive sensor 20, is transferred to an even pixel transmission register 21 (CCD shift register) and an odd pixel transmission register 22 (CCD shift register) through a gate. Then, the electrical charge is synchronized with an image clock by an output gate circuit 23 so as to be serially output as shown in FIG. 4.

Figure 6:
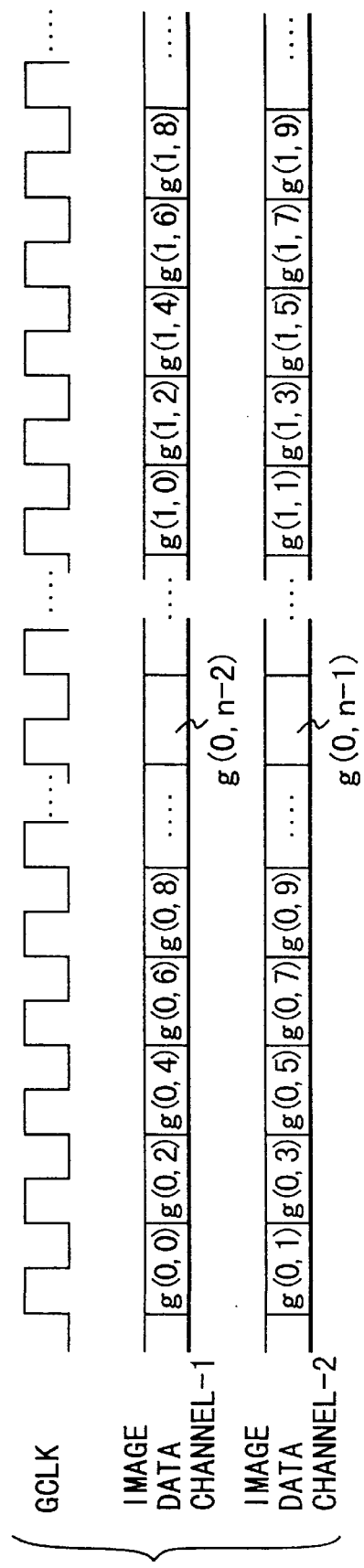
FIG. 6 is a view showing an example of image data output from the image input section of the structure shown in FIG. 5.
Figure 5:
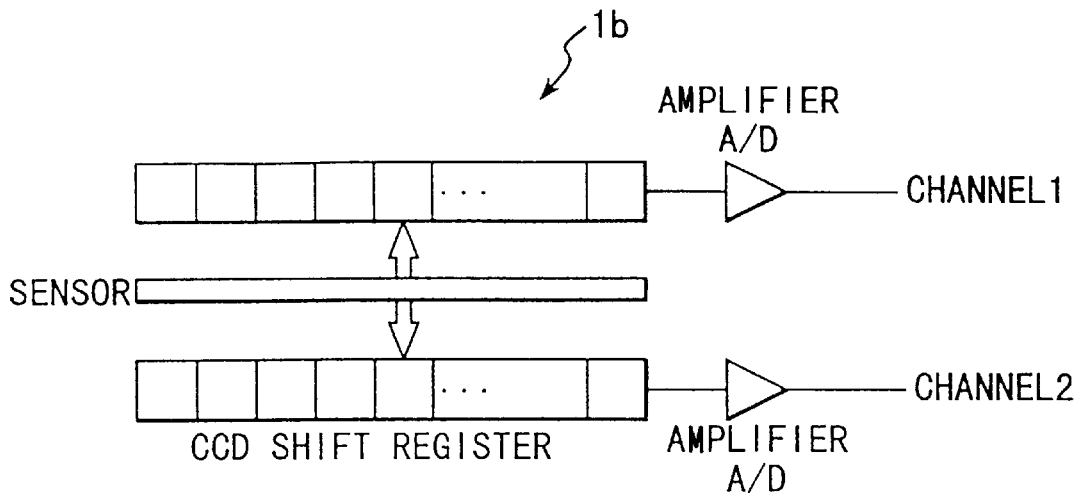
FIG. 5 is a view showing the structure of an image input section of FIG. 1, that is, a case of outputting two-channel image data.
Figure 7:
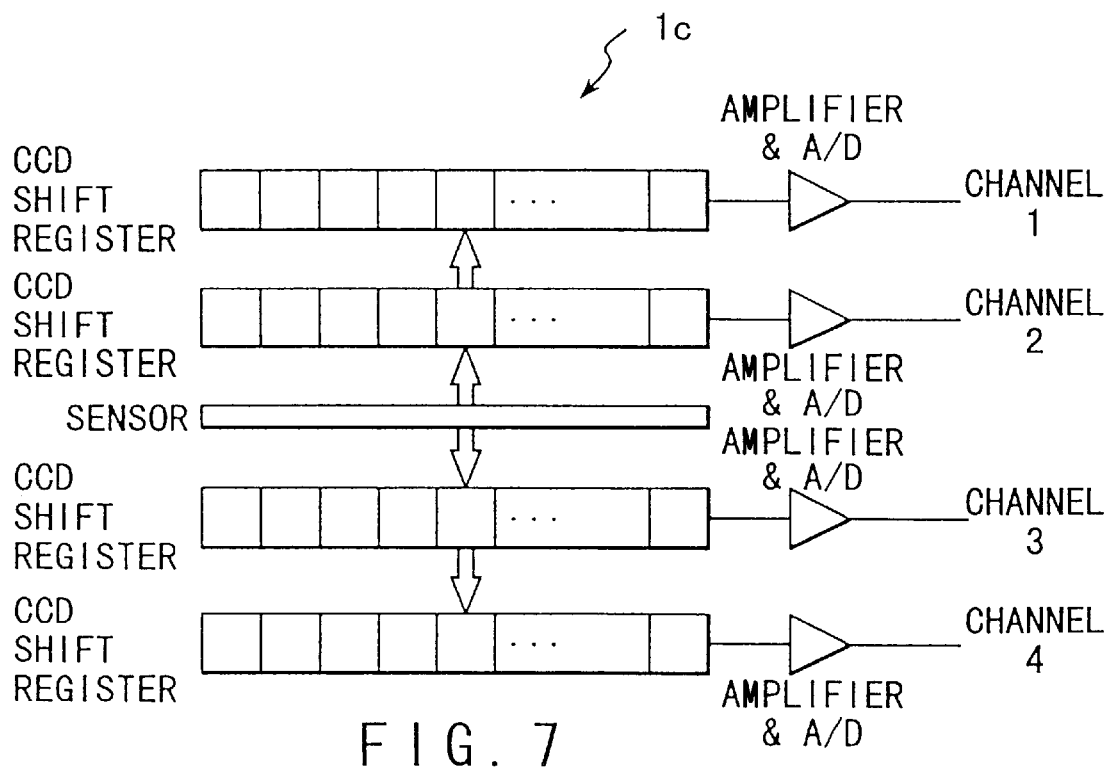
FIG. 7 is a view showing the other structure of the image input section of FIG. 1, that is, a case of outputting four-channel image data.
Figure 8:
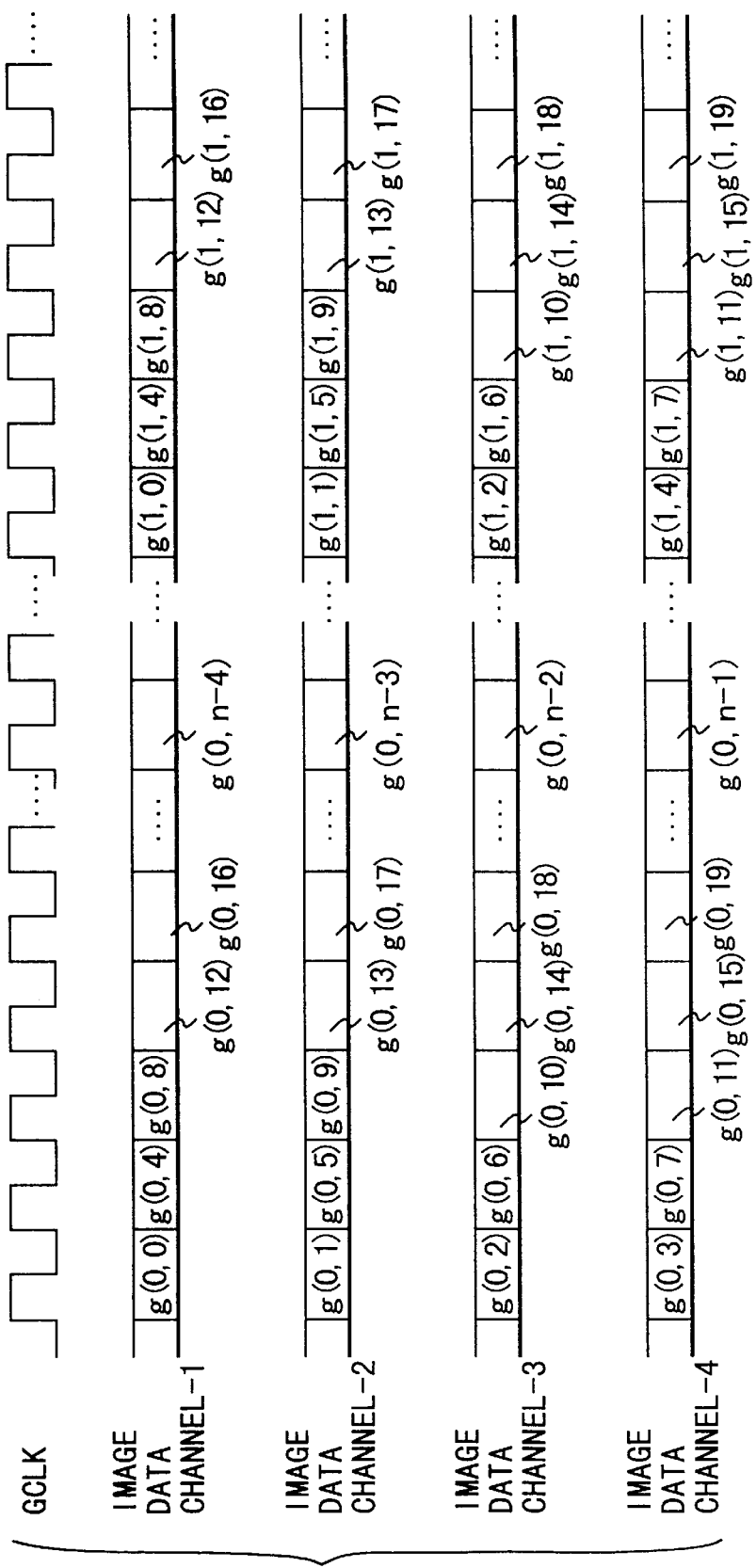
FIG. 8 is a view showing an example of image data output from the image input section of the structure shown in FIG. 7.

However, in a case of the high-speed sensor with high resolution, since the image clock frequency is high, there occurs a problem in the serial output process. In this case, it is considered that image data of a plurality of channels be simultaneously output. For example, as shown in FIG. 5, two channels of the even pixel and the odd pixel are simultaneously output in synchronous with one image clock. FIG. 6 shows an output operation of first image data S1 corresponding to the structure of the image input section 1b of FIG. 5. Moreover, as shown in FIG. 7, it is considered that four pixels contained in the main scanning direction be simultaneously output in synchronous with one image clock. FIG. 8 shows an output operation of first image data S1 corresponding to the structure of the image input section 1c of FIG. 7.

Figure 10:
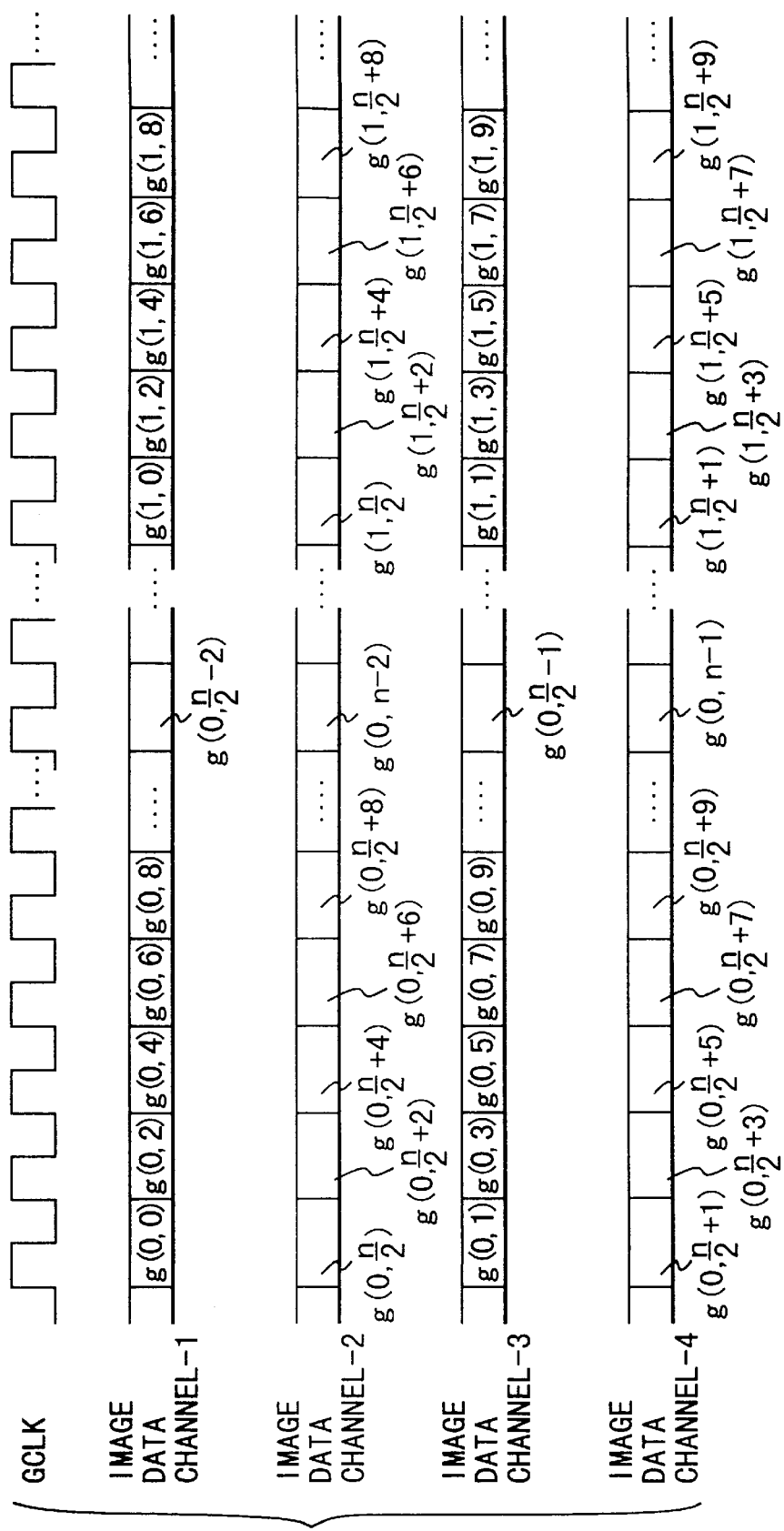
FIG. 10 is a view showing an example of image data output from the image input section of the structure shown in FIG. 9.

In FIGS. 5 and 7, the output signals of the CCD sensor are output in the raster form (data is output from the left end of one scanning line to the right end). In FIG. 9, the structure of an image input section 1d using a high-speed sensor, which is not the raster type, is shown. In FIG. 9, there are provided right and left sensors 20a and 20b, and shift registers 21a, 21b, 22a, and 22b as shown in FIG. 5. The total of four pixels including left two pixels and right two pixels are output in an FILO (First In Last Out) form or an FIFO (First In First Out) form in synchronous with the image clock as shown in FIG. 10.

Figure 12:
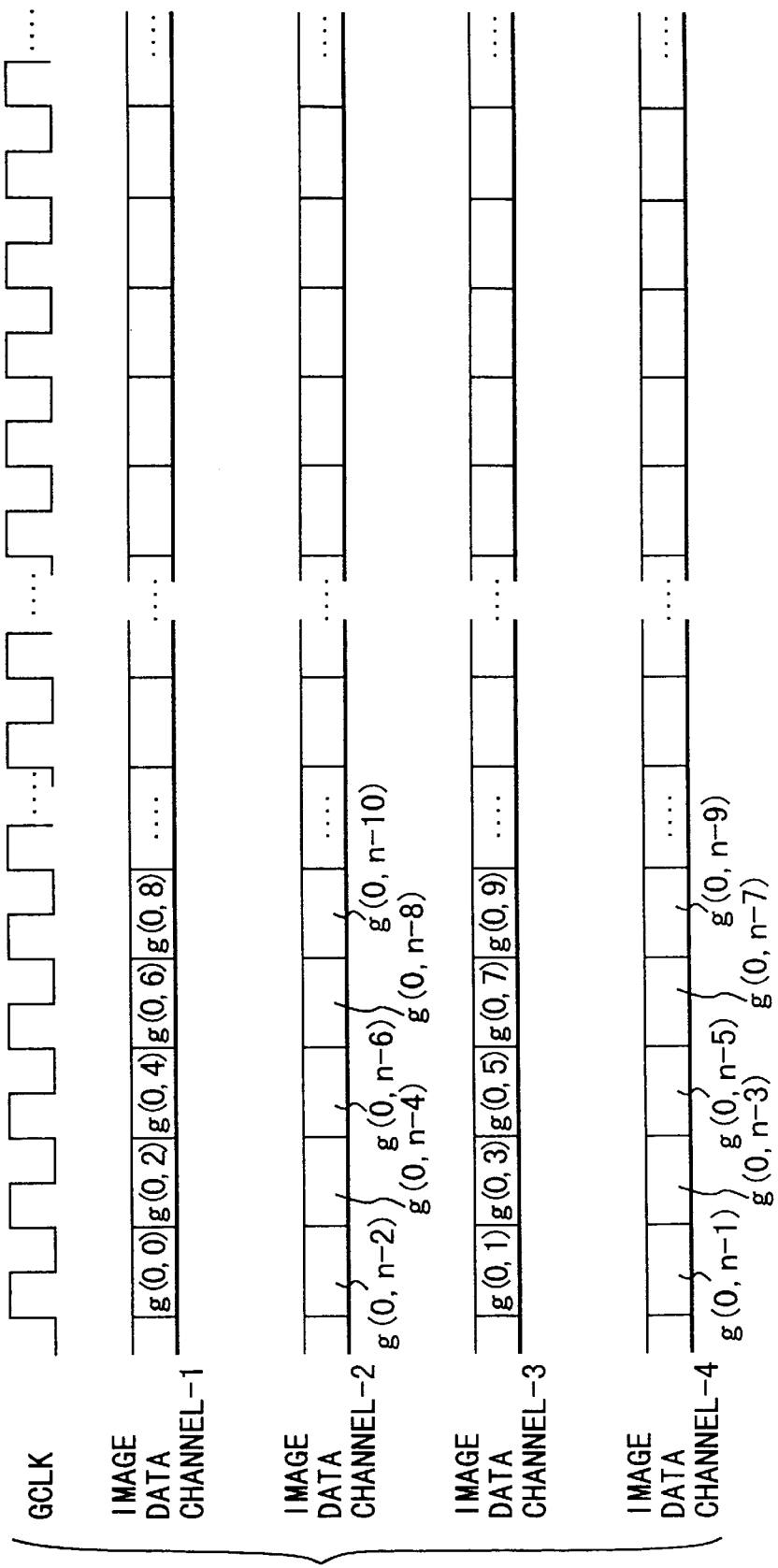
FIG. 12 is a view showing an example of image data output from the image input section of the structure shown in FIG. 11.

FIG. 11 shows an image input section 1e which is the other structure of the high-speed sensor of the type in which a plurality of pixels is simultaneously output. Similar to FIG. 9, the sensor is divided to right and left sensors. Then, the shift registers as shown in FIG. 5 are connected to each of the sensors. In the case of FIG. 11, the left CCD shift registers sequentially output the pixels from the left side and the right CCD shift registers sequentially output the pixels from the right side as shown in FIG. 12. Similarly, there can be considered the structure in which the left CCD shift registers output the pixels from the right side and the right CCD shift registers output the pixel from the left side.

Next, the following will explain the input image converter 2 of FIG. 1.

Figure 13:
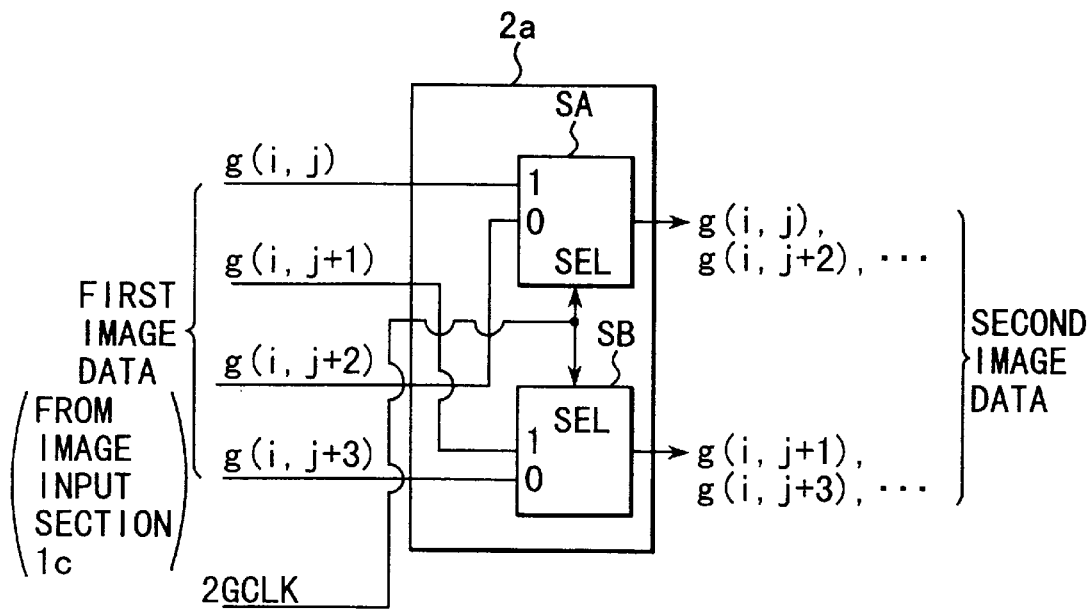
FIG. 13 is a view showing the other structure of an input image converting section of FIG. 1, that is, a case of converting four-channel image data of a raster form to two-channel image data of a raster form.

The input image converter 2 converts first image data S1 of a plurality of channels input by the image input section 1 to an image to adapt to the process system of the image processor 3. FIG. 13 shows the structure of an input image converter 2a. In this case, the process order of the image processor 3 is the same as the order of the pixels input as first image data S1. The image process speed of the image processor 3 is twice as fast as the image clock of first image data S1, and this image process speed is applied to a case in which two pixels are simultaneously processed by the image processor 3.

Figure 14:
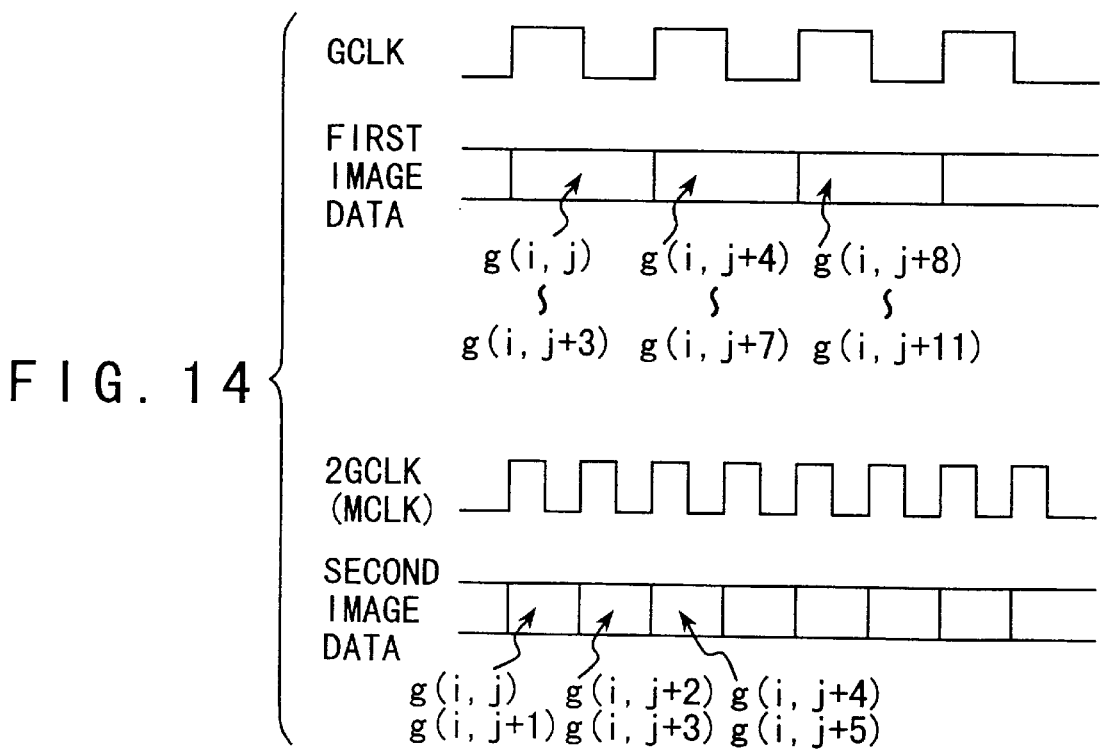
FIG. 14 is a timing chart for explaining an operation of the input image converting section of FIG. 13.

The input image converter 2a synchronizes first image data S1 with 2GCLK, which is twice as large as the image clock GCLK, as shown in FIG. 14. Then, the input image converter 2a converts first image data S1 of four-pixel simultaneous raster type to second image data S2 of two-pixel simultaneous raster type.

In the structure of FIG. 13, selectors SA and SB are used, and pixel g (i, j), which is image data of channel 1 of first image data S1 where four pixels are simultaneously input, and pixel g (i, j+2), which is image data of two channel 2, are connected to two input terminals of selector SA, respectively. Moreover, pixel g (i, j+1), which is image data of channel 3 of first image data, and pixel g (i, j+3), which is image data of channel 4, are connected to two input terminals of selector SB, respectively. In this case, 2GCLK, which is twice as large as the image clock GCLK, is used as a select signal of each of selectors SA and SB.

When GCLK is "1", pixels g (i, j) and g (i, j+1) are selected. When GCLK is "0", pixels g (i, j+2) and g (i, j+3) are selected. As a result, as shown in FIG. 14, first image data S1 is converted to second image data S2 of two channel of a raster form, which is synchronized with image clock 2GCLK and is output in units of two pixels.

Although FIGS. 13 and 14 are explained in the case in which the image where four pixels are simultaneously input are converted to the image where two pixels are simultaneously output, there can be considered that an image where x pixels are simultaneously input is converted to an image where y pixels are simultaneously output.

Figure 15:
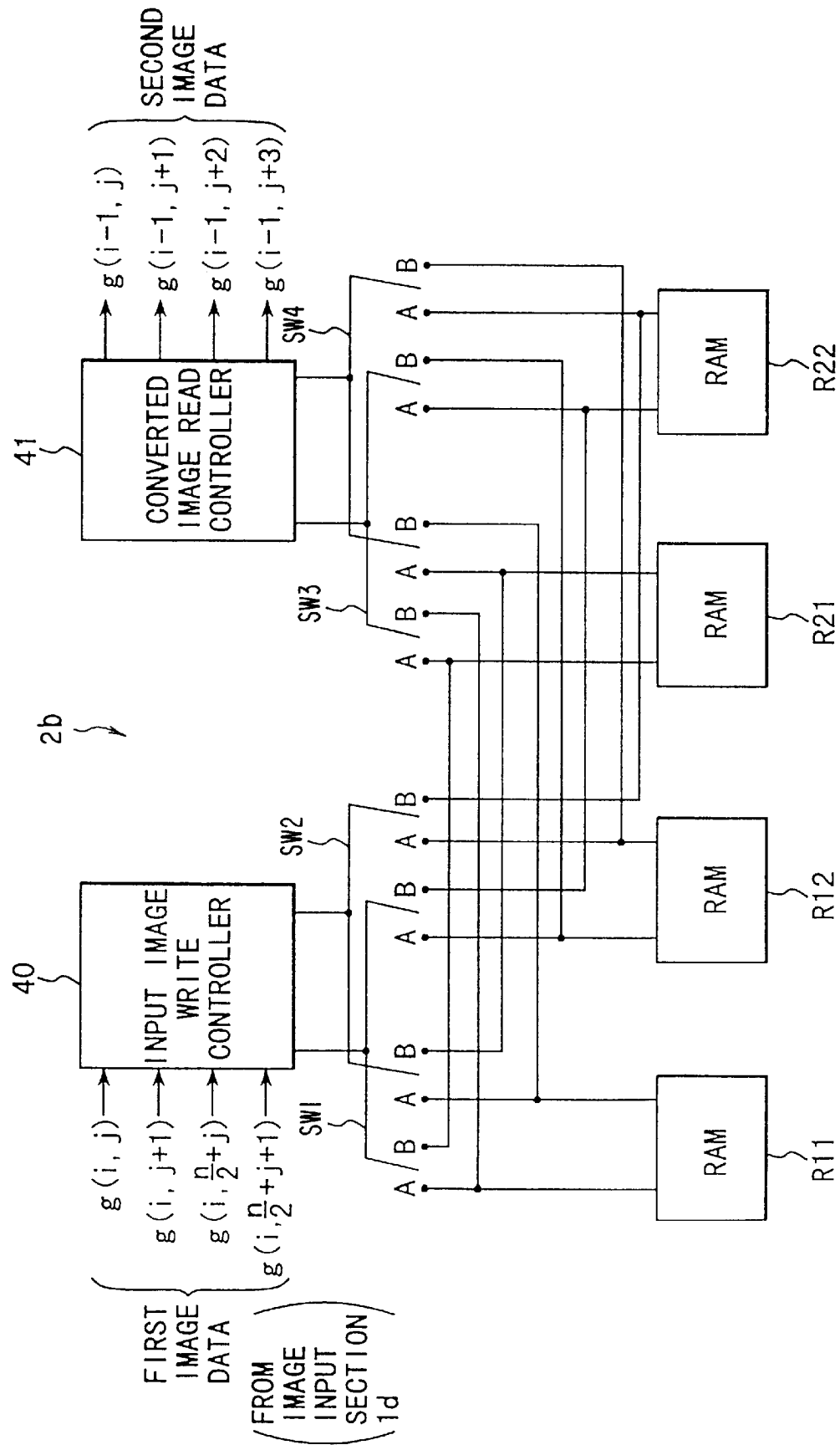
FIG. 15 is a view showing the other structure of an input image converting section of FIG. 1, that is, a case of converting four-channel image data of a non-raster form to four-channel image data of a raster form.

FIG. 15 shows the other structure of the input image converter 2, that is, the structure of an input image converter 2b. More specifically, if the image input section 1 is not the raster output type, that is the structure as shown in FIG. 9, the input image converter 2b rearranges first image data S1, which is output from the input image section 1, to be a raster form.

The input image converter 2b mainly comprises an input image writing controller 40 and a converted image reading controller 41.

The input image writing controller 40 controls first image data S1 to be written to temporarily storage memories (RAM) R11, R12, R21, and R22 after switching every channel. Specifically, switches SW1 to SW4 are switched to A or B every channel, so that writing control is performed.

If the number of pixels per one line in the main scanning direction is n, first image data S1, which is input to the controller 40 every one clock of the image clock GCLK are g (i, j), g (i, j+1), g (i, n/2+j), and g (i, n/2+j+1).

In a case where the image input section 1 is structured as shown in FIG. 11, first image data S1, which is input to the input image writing controller 40 every one clock of the image clock GCLK are g (i, j), g (i, j+1), g (i, n−j), and g (i, n−j−1).

When first image data S1 is written to the memories (RAM) R11, and R12, second image data S2 is read from the memories (RAM) R21, and R22 by the converted image reading controller 41 (at this time, switches SW1 to SW4 are connected to terminal A).

When first image data S1 is written to the memories (RAM) R21, and R22, second image data S2 is read from the memories (RAM) R11, and R12 by the converted image reading controller 41 (at this time, switches SW1 to SW4 are connected to terminal B).

In this case, there is one lines delay between writing data and reading data. When i-th line in the sub-scanning direction is written, data which corresponds to (i−1)-th line is read in the raster form.

Figure 16:
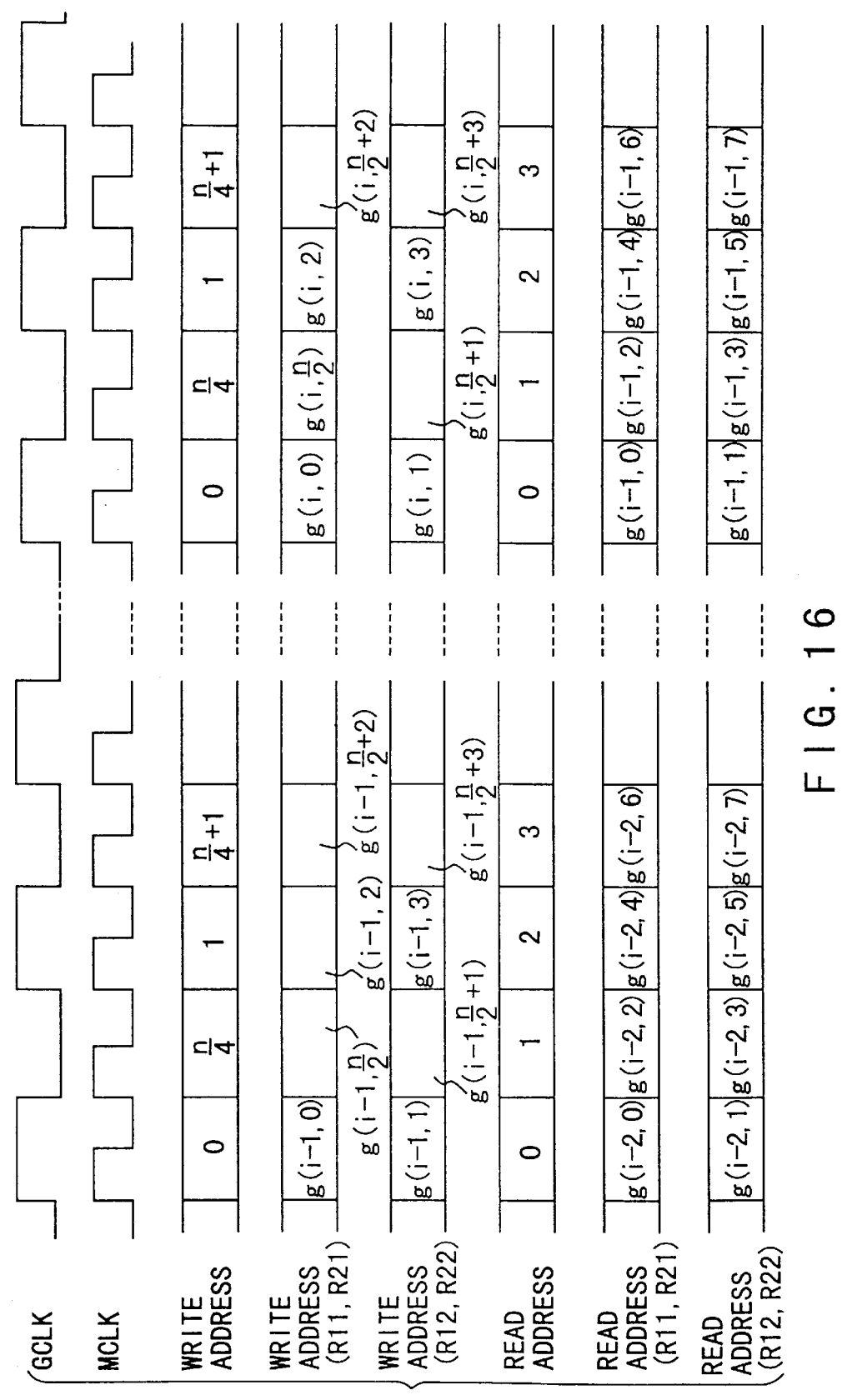

FIG. 16 shows an operation of the input image converter 2b shown in FIG. 15. In other words, regarding first image data S1 (FIG. 10) output from the image input section 1d as structured in FIG. 9, FIG. 16 shows the relationship between a write address generated by the controller 40 and first image data S1 written to RAM to correspond to the write address, and the relationship between a read address generated by the controller 41 and second image data S2 read from RAM to correspond to the read address.

As shown in FIG. 16, when first image data S1, which is input to the converter 2b at the first clock of the image clock GCLK, is g (i−1, 0), g (i−1, 1), g (i−1, n/2), g (i−1, n/2+1), the following data can be written.

Specifically, data, which is written to address "0" of the memories R11 and R12 at the first clock of the image clock MCLK whose rate is twice as fast as the image clock GCLk, is g (i−1, 0), g (i−1, 1). Data, which is written to address "n/4" of the memories R11 and R12 at the second clock of the image clock MCLK is g (i−1, n/n), g (i−1, n/2+1). Similarly, first image data S1, which is synchronized with the image clock MCLK and input every four pixels, is written to the memories R11, R12, R21, and R22 in synchronous with the image clock MCLK.

When first image data S1 is written to the memories R11 and R12, g (i−2, 0) and g (i−2, 1) are read from address "0" of the memories R21 and R22 at the first clock of the image clock MCLK. Then, g (i−2, 2) and g (i−2, 3) are read from address "1" of the memories R21 and R22 at the second clock of the image clock MCLK. These four pixels are simultaneously read at the next first clock of the image clock GCLK. Similarly, second image data S2 of four pixel parallel type, which is synchronized with image clock GCLK to be rearranged, is output.

In the case of first image data output from the image input section 1e as structured in FIG. 11, the write address and the read address may be generated based on the same way as FIG. 16.

Figure 17:
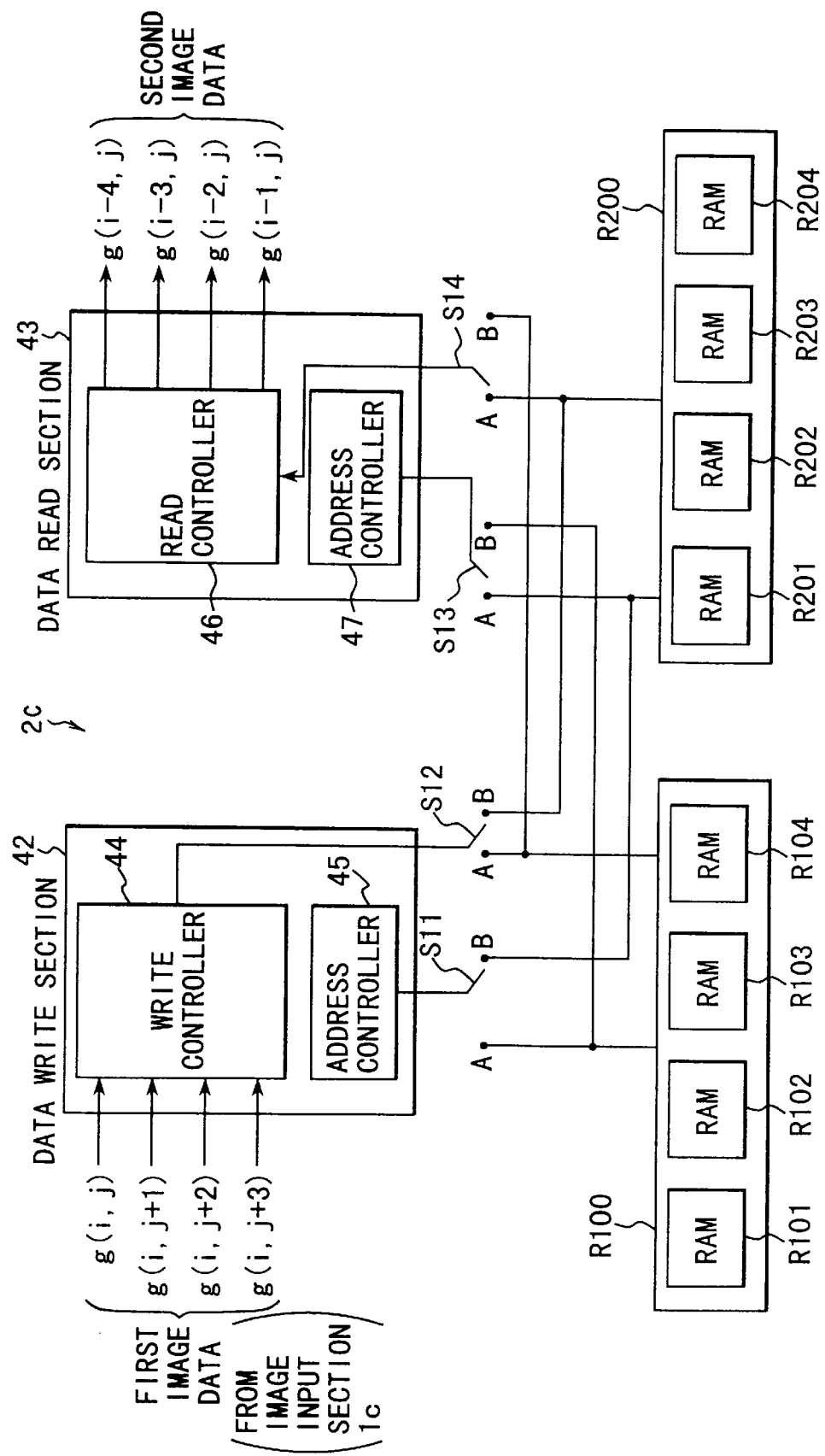
FIG. 17 is a view showing the other structure of an input image converting section of FIG. 1, that is, a case of converting four-channel image data of a raster form to four-channel image data of a non-raster form.

FIG. 17 is the other structure of the input image converter 2. Particularly, FIG. 17 shows the structure of an input image converter 2c for converting first image data S1, which is four-pixel simultaneous raster data output from the image input section 1c, to four-line simultaneously input data.

The input image converter 2c comprises a data writing section 42, a data reading section 43, and two RAM banks R100 and R200 serving as temporarily data storing means.

The data writing section 42 comprises a writing controller 44, and an address generator 45. The data reading section 43 comprises a reading controller 46 and an address generator 47.

The RAM bank R100 comprises memories (RAM) R101, R102, R103, and R104. The RAM bank R200 comprises memories (RAM) R201, R202, R203, and R204. If one of RAM banks R100 and R200 is used as a write-only bank, the other is used as a read-only bank, and this function is switched every four lines in the sub-scanning direction.

If the switches S11 to S14 are connected to terminal A, the RAM bank R100 is used as a write-only bank and the RAM bank R200 is used as a read-only bank. If the switches S11 to S14 are connected to terminal B, the RAM bank R100 is used as a read-only bank and the RAM bank R200 is used as a write-only bank.

Figure 18:
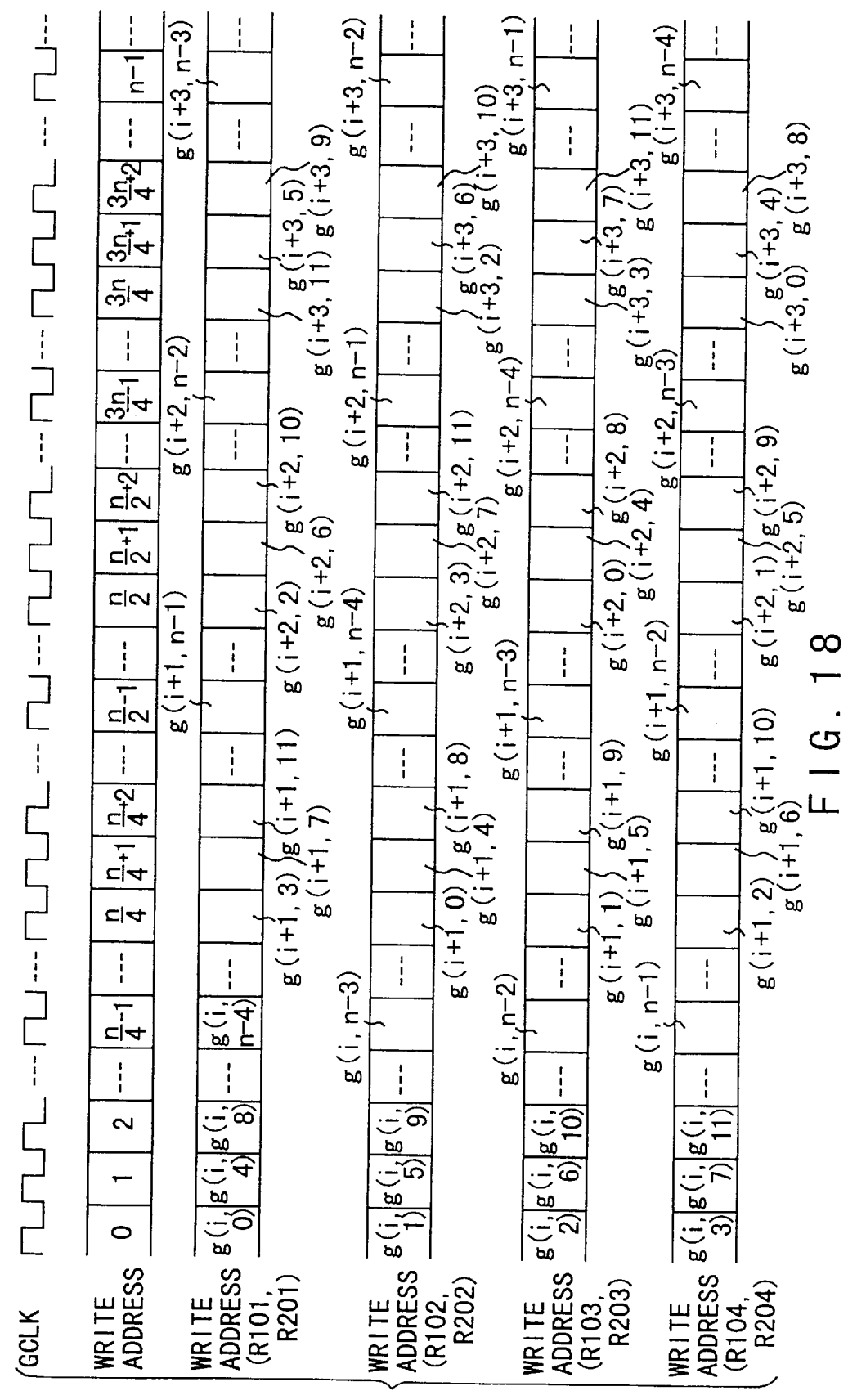
Figure 19:
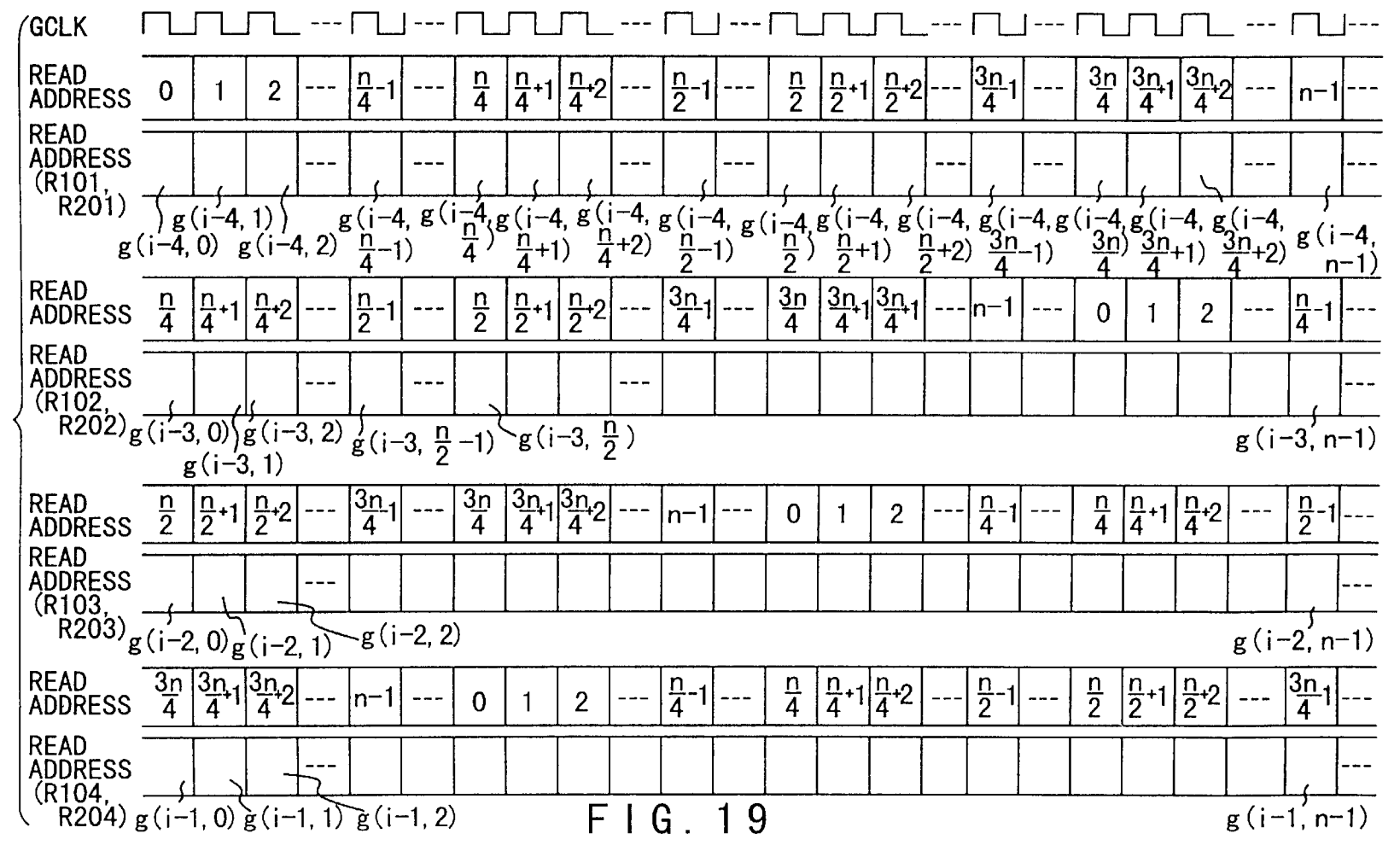

FIG. 18 shows data writing timing corresponding to the write address generated by the address generator 45. FIG. 19 shows data reading timing corresponding to the read address generated by the address generator 47.

As shown in FIG. 18, at the time of writing four pixels, which are simultaneously input to four memories R101 to R104, respectively, these four pixels are written by each line unit of four lines in the sub-scanning direction as being shifted. In other words, data, corresponding to the first line of the sub-scanning direction of image data S1, is written to each of the memories R101, R102, R103, and R104 of the RAM bank R100 in order of ((0, 1, 2, 3), (4, 5, 6, 7), . . . ). Data, corresponding to the second line, is written in order of ((3, 0, 1, 2), (7, 4, 5, 6), . . . ). Data, corresponding to the third line, is written in order of ((2, 3, 0, 1), (6, 7, 4, 5), . . . ). Data, corresponding to the fourth line, is written in order of ((1, 2, 3, 0), (5, 6, 7, 4), . . . ). If data of each line is written in the same order without having such a writing operation, four data must be simultaneously read from the same memory at the reading operation. This is not realizable.

At the time of reading four pixels, if addresses which are shifted by (n/4) are input to the respective memories, and data is read from the corresponding RAM, an image is read in the form that four pixels are simultaneously output as shown in FIG. 19. In other words, for example, if RAM bank R100 is used as a read-only RAM, a start address of R201 is "0", a start address of R202 is "n/4", a start address of R203 is "2n/4", and a start address of R204 is "3n/4." As a result, first image data S1 of the parallel form in which four pixels are contained in the main scanning direction is converted to second image data S2 of the parallel form in which four pixels are contained in the sub-scanning direction.

In other words, if n pixels, which continue in the main scanning direction, are input to the input image converter, (n/4) pixels are read from each of four lines continuing in the sub-scanning direction. In this case, n is the number of pixels of one line continuing in the main scanning direction of the input image.

As shown in FIG. 19, when four pixels continuing in the main direction are input to the input image converter 2c from the image input section 1c, four pixels continuing in the sub-scanning direction are simultaneously output as a converted image. In this case, delay between the input and output of the input image converter 2c is four lines in the sub-scanning direction. When n pixels of each of i-th line, (i+1)-th line, . . . (i+3) in the sub-scanning direction are input, the image on (i-4)-th to (i-1)-th four lines, that is, second image data S2 is output unit of four line as a converted image.

The explanation of FIGS. 17 to 19 was made based on the assumption that the structure of the image input section 1 was the structure as shown in FIG. 7. Even if the structure shown in FIGS. 9 and 11 are used, the write address generation and the read address generation are performed by the data write section 42 of the input image converter 2c and the data read section 43, respectively, and the write control and the read control are performed based on the above-mentioned idea. Thereby, first image data S1 is arrayed to be a predetermined form. As a result, first image data S1, which is input in accordance with the characteristic of the image input section 1, can be converted to second image data S2.

As explained above, by the input image converter 2, image data of the plurality of channels can be converted from the non-raster form to the raster form or from the raster form to the non-raster form. Moreover, when image data of the plurality of channels whose pixels in the main scanning direction are discontinued are simultaneously input, the input image converter 2 can convert the image data of the plurality of channels to the raster form or the non-raster form. By the conversion of the forms of image data, the image formation using the multi-beam to be described later can be performed. In a case where the processing order of the image processor 3 is the same as the order of the pixels to be input as first image data S1 and the processing speed is also the same, no input image converter 2 is needed.

Next, the following will explain the image processor 3 of FIG. 1.

Figure 20:
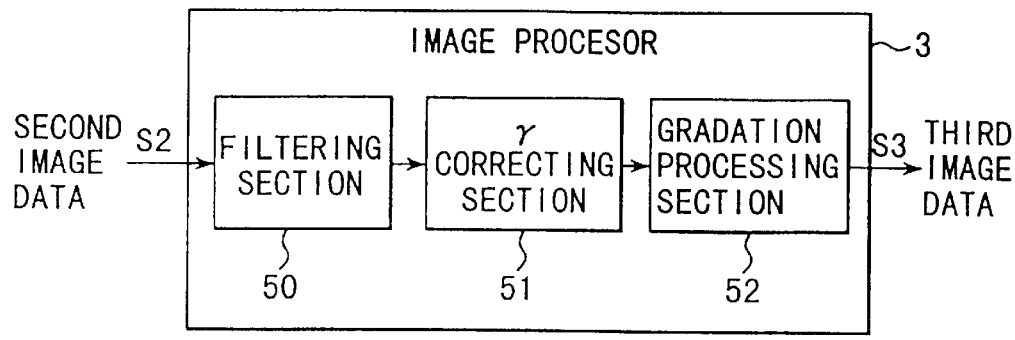
FIG. 20 is a view showing the structure of an image processor of FIG. 1.

FIG. 20 schematically shows the structure of the image processor 3.

In FIG. 20, a filtering section 50 corrects a filtering for restraining noise of input second image data S2 and an MTF (Modulation Transfer Function). A γ correcting section corrects a non-linear characteristic of the I/O system. A gradation processor 52 reduces the number of density levels of the input image to maintain a pseudo gradation in accordance with the number of density levels of the output device.

Figure 21:
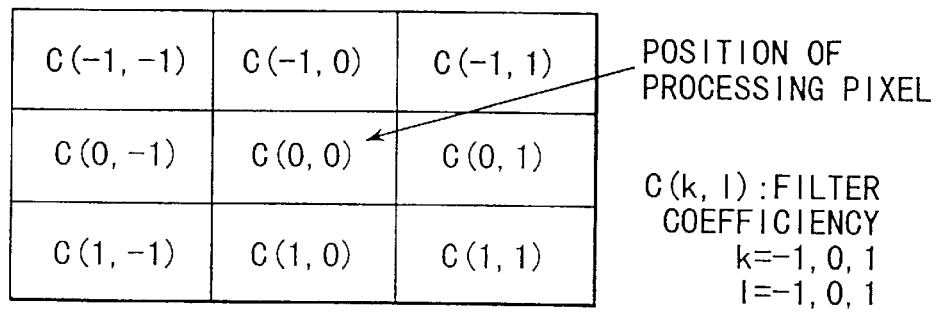
FIG. 21 is a view explaining an operation of a filtering section.

The filtering section 50 performs the following calculation:

Specifically, each of the peripheral pixels of pixel g (i, j) is multiplied by a filter coefficient c (k, l) shown by a (3×3) window in FIG. 21, and all results are added together so as to obtain g' (i, j) as a filter output (see equation (1)). Each filter coefficient c (k, l) is one value, which is set in accordance with a filter characteristic required in a high-pass filter or a low-pass filter.

$$g'(i, j)=\Sigma c(k, 1) \times g(i-k, j-1) \tag{1}$$

where k=-1, 0, 1 and 1=-1, 0, 1.

Figure 22:
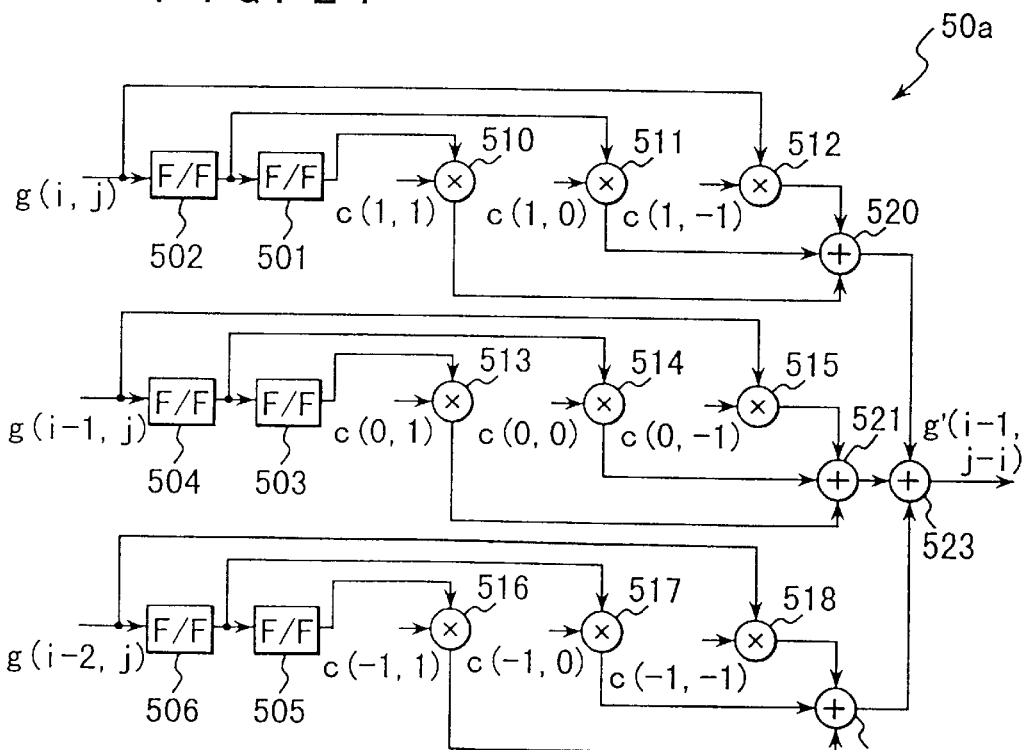
FIG. 22 is a view showing the structure of the filtering section.

FIG. 22 shows an example of the structure of the filtering section as a filtering section 50a. In FIG. 22, pixel g (i-1, j) is the pixel, which is input in the sub-scanning direction one line previous to pixel g (i, j). Pixel g (i-2, j) is the pixel, which is input two lines previous to pixel g (i, j). Pixel data, which is latched by flip-flop circuits 501 to 502, and pixel data, which is input to the flip-flop circuit 502, are multiplied by filter coefficients C (1, 1), C (1, 0), C (1, -1) by multipliers 510 to 512. Pixel data, which is latched by flip-flop circuits 503 to 504, and pixel data, which is input to the flip-flop circuit 504, are multiplied by filter coefficients C (0, 1), C (0, 0), C (0, -1) by multipliers 513 to 515. Pixel data, which is latched by flip-flop circuits 505 to 506, and pixel data, which is input to the flip-flop circuit 506, are multiplied by filter coefficients C (1, 1), C (1, 0), C (1, -1) by multipliers 516 to 518. Outputs of the multipliers are added together by adders 520 to 523 so as to output a filter result of pixel g (i-1, j-1) to be processed.

Next, the following will explain the γ correcting section 51.

The γ correction corrects the non-linear characteristic of the input and output. As shown in FIG. 23A, for example, if the I/O (Input/Output) characteristic of the device is a curve X, which is shown by a thin solid line, the γ correcting section 51 corrects the curve X to a straight line Z, which is shown by a thick solid line, by use of a curve Y (correction curve) having a characteristic opposite to the curve X.

The γ correcting section 51 measures the correction curve Y against the curve X in advance. Then, the measured value, serving as a look up table (LUT), is stored in a memory 550 such as RAM as shown in γ correcting section 51a of FIG. 23B. Then, input of the γ correcting section 51a is used as an entry address for the look up table stored in the memory 550 so as to output the corresponding correction value.

Next, the following will explain the gradation processor 52.

FIG. 24A shows the structure of a gradation processor 52a, which comprises a comparator 560. The comparator 560 compares a value of pixel data input to one input terminal with a predetermined threshold value Thr input to the other input terminal. If the value of pixel data is larger than the threshold value Thr, the gradation processor 52 outputs "1" (black). If the value of pixel data is smaller than the threshold value Thr, the gradation processor 52 output "0" (white).

A threshold value Thr, which is a fixed value, is called a simple threshold processing. As shown in FIG. 24B, a case in which each threshold value Thr is repeatedly used in the main scanning and the sub-scanning direction is called a systematic dither method. In the systematic dither method, gradation reproduction is better than the simple threshold processing. However, character reproduction is not good.

Figure 25:
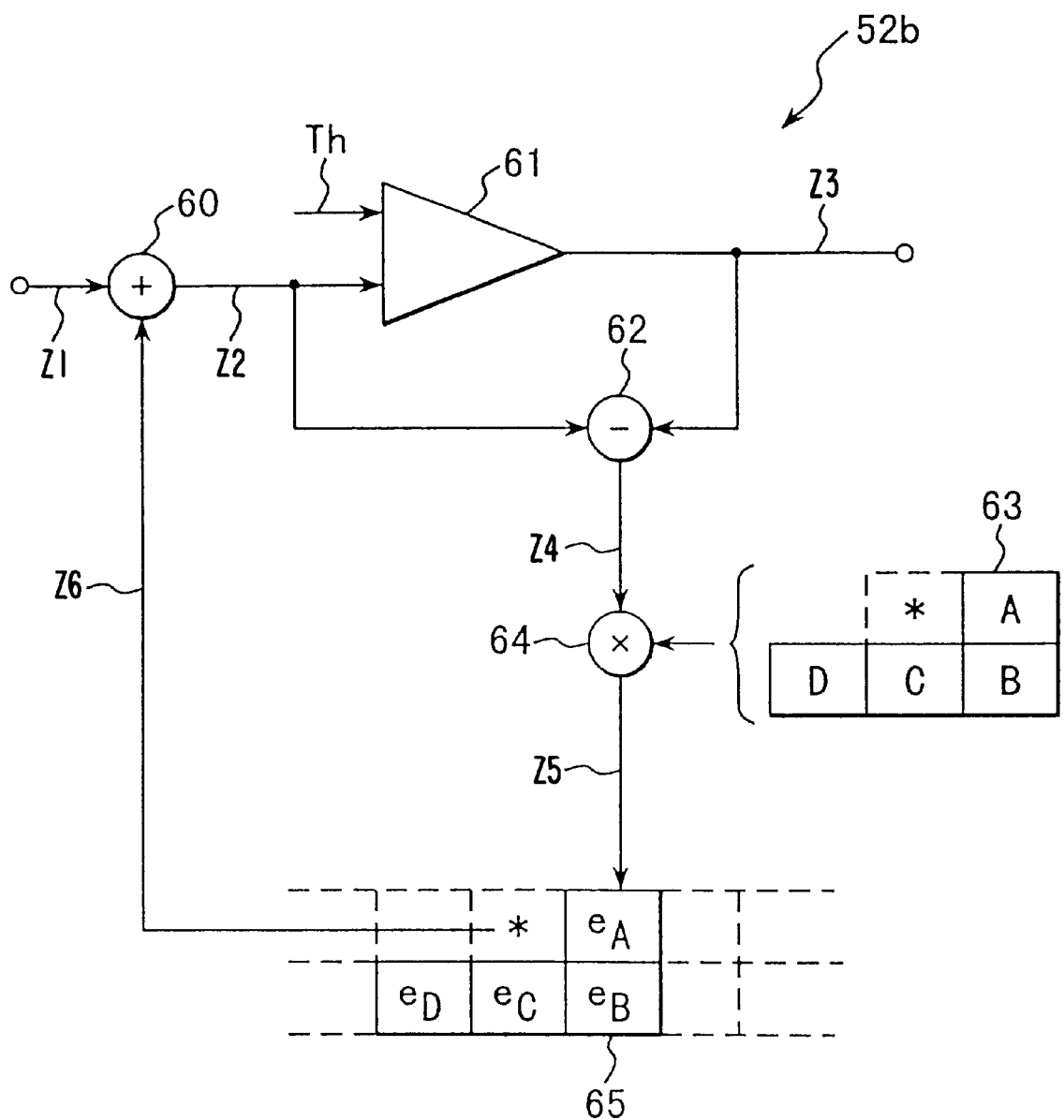
FIG. 25 is a view explaining the structure of the gradation processing section and the processing operation, that is, an error diffusion processing.

FIG. 25 shows the other structure of the gradation processor 25, specifically, a gradation processor 52b performing a gradation processing, which is called an error diffusion method.

Unlike the systematic dither or the simple threshold processing, the error diffusion method is a feedback type system. In the error diffusion method, it can be said that both the gradation reproduction and resolution characteristics are better than the systematic dither.

In FIG. 25, Z1: an input image signal, 60: a correction section for correcting an image signal of target pixel, Z2: a correction image signal, 61: a binary conversion section for making the corrected image signal of target pixel binary, Z3: a binary image signal, 62: a binary conversion error calculation section for calculating a binary conversion error of the binary image signal, Z4: a binary conversion error signal, 63: a weight coefficient storing section for storing an error filter weight coefficient, 64: a weighted error calculation section for multiplying the binary conversion error calculated by the calculation section 62 by the error filter weight coefficient of the storing section 63 to calculate a weighted error, a weighted error signal, 65: an error storing section for storing the weighted error calculated by the calculation section 64, and Z6: an image correction signal.

The following will specifically explain the binary conversion process by the error diffusion method:

The input signal Z1 read by the input device such as a scanner (image data output from the γ correcting section 51 in this embodiment) is corrected by the correction section 60 to be output as the correction image signal Z2. The binary conversion section 61 to which the correction image signal z2 is supplied uses the correction image signal Z2 and the binary conversion threshold value Th (e.g., "80h" in which "h" is "hex" showing a hexadecimal). Then, the binary conversion section 61 outputs "1" (block pixel) as binary image signal Z3 if the correction image signal Z2 is larger than the binary conversion threshold value Th. If the correction image Z2 is smaller than the binary conversion threshold value Th, the binary conversion section 61 outputs "0" (white pixel). Next, the binary conversion error calculation section 62 calculates a difference between the correction image signal z2 and the binary image signal z3 to be output as binary conversion error signal Z4. In this case, "0" of the binary image signal Z corresponds to "0h", and "1" corresponds to "FFh." The error filter shown by the storage section 63 has the structure of the error filter which is generally used. In the mark "*" of the storage section 63 shows the position of the target pixel. The calculation section 64 multiplies the binary conversion error signal Z4 by the weight coefficients A, B, C, D (A=7/16, B=1/16, C=5/16, D=3/16) so as to calculate the weighted error Z5. In other words, the binary conversion error of the target pixel is multiplied by the weight coefficients A, B, C, D so as to calculate the weighted error of the peripheral four pixels (corresponding to the positions of weight coefficients A, B, C, D) of the target pixel.

The error storing section 65 stores the weighted error Z5 of the peripheral four pixels calculated by the weighted error calculation section 64. In other words, the error storing section 65 stores the result obtained by adding each of the weighted errors of four pixels calculated by the calculation section 64 to each of areas eA, eB, eC, and eD relative to the pixel "*" to be noticed. The pixel correction signal Z6 is the signal of the position of "*", that is, data storing the above-calculated weighted errors of four pixels.

In recent years, in the error diffusion processing for the case in which the number of gradations (number of density levels) of the output device (e.g., copy machine), there has been used multi-valuing means using the threshold value corresponding to the number of gradations in place of the above-explained binary conversion section 61. Similarly, there can be considered a multi-valuing system on the basis of the dither method or the simple threshold processing.

In the above explanation of the image processor 3, the processing of one pixel unit was explained. However, in the processing other than the error diffusion processing, the plurality of pixels can be simultaneously processed in parallel even in the raster input or the simultaneous input of the plurality of channels.

In the case of the gradation processing by the error diffusion, the plurality of pixels cannot be simultaneously processed in parallel in the main scanning direction since the error must be diffused to the adjacent pixel. However, in the case of the plurality of lines simultaneously input, the plurality of pixels can be simultaneously processed in parallel as described below:

FIG. 26 shows the structure of a filtering section 50b, which performs the filtering processing in which a plurality of pixels is simultaneously filtered in the case of the plurality lines (e.g., four lines) simultaneous input. As shown in FIG. 26, for example, a plurality of filters 570a to 570c, which performs the processing of one pixel unit as shown in FIG. 22, can be formed in parallel in accordance with the input line.

FIG. 27 shows the structure of a γ correcting section 51b in the case of the plurality lines (e.g., three lines) simultaneous input. As shown in FIG. 27, the γ correction can be also structured as follows:

Specifically, a plurality of memories storing the look up table (LUT), which performs the processing of one pixel unit of the structure shown in FIG. 23B, is formed in parallel in accordance with the input line.

The correction curves Y can be obtained in accordance with the characteristic of the I/O device such as a laser device or an optical system to correspond to each line to be input. Then, each of LUT1 to LUT 3 corresponding to each of correction curves Y is stored in each of memories 580a, 580b, and 580c corresponding to each of the lines. Thereby, the characteristic of each laser device of the multi-beam can be finely adjusted.

Next, the error diffusion processing of the plurality of lines simultaneously input form will be explained with reference to a gradation processor 52c shown in FIG. 28.

Similar to the filtering process 50b (FIG. 26), and the 65 correcting section 51b (FIG. 27), a plurality of error diffusion processors (590a to 590c) structured as shown in FIG. 25 must be provided in accordance with the number of lines (e. g., three lines) to be simultaneously input.

Figure 28:
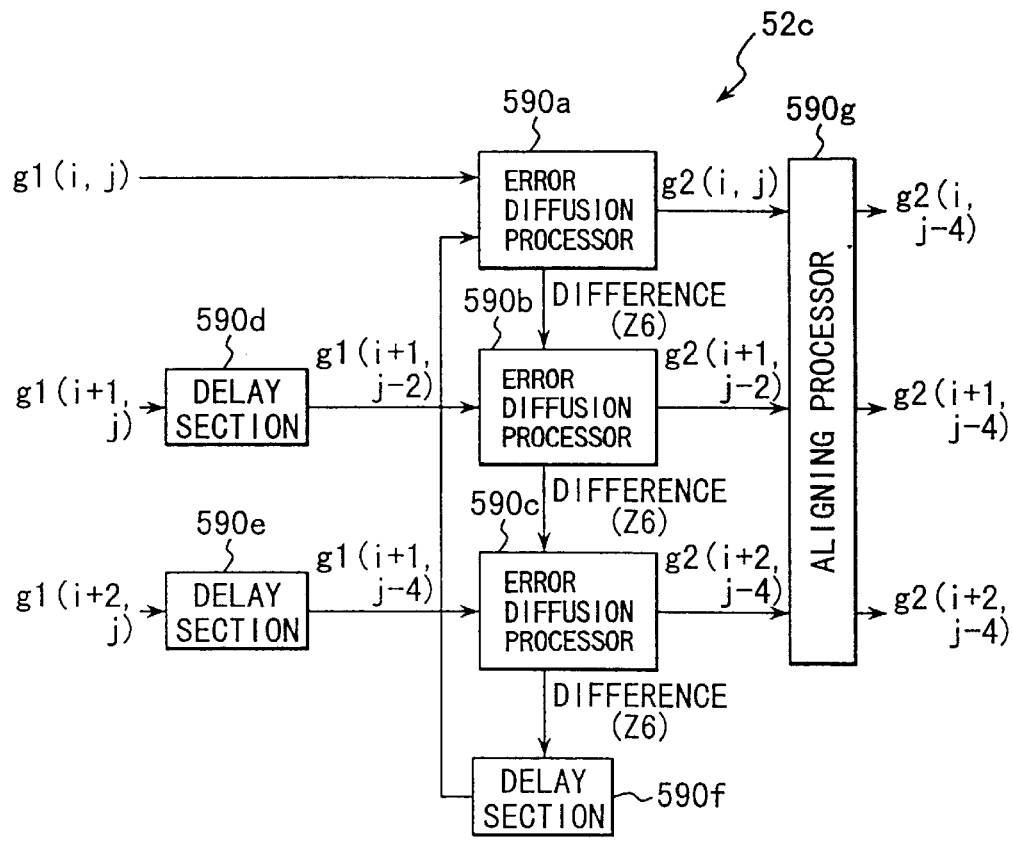
FIG. 28 is a view showing the structure of the gradation processing section for providing an error diffusion processing to image data of a plurality of lines in parallel.
Figure 29:
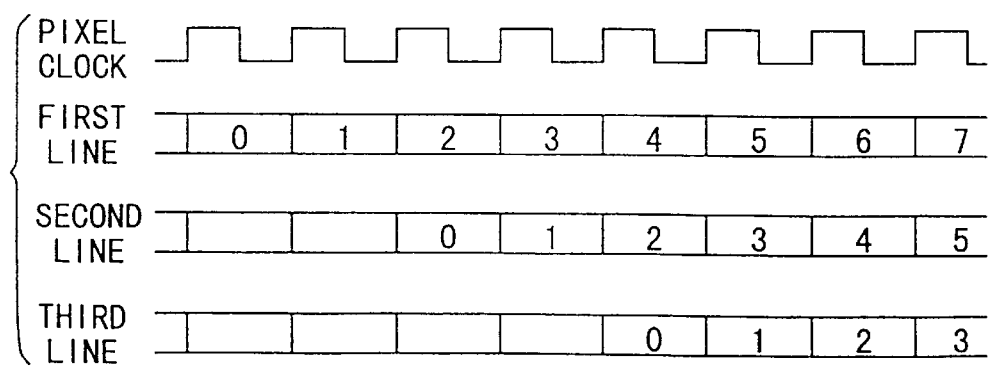
FIG. 29 is a timing chart explaining an operation of the gradation processing section of FIG. 28.

Moreover, as shown in FIG. 28, to absorb the error (pixel correction signal Z6) diffused from the previous line, it is necessary to provide delay sections 590d, 590e, and 590f for delaying the plurality of pixels (at least two pixels or more in the case that the structure of each of error diffusion processors 590a to 590c is as shown in FIG. 25) between the lines. In this case, FIG. 29 shows timing of each of lines (first to third lines) to be input to each of the error diffusion processors 590a to 590c. Thereby, the conventional error diffusion system can be directly used. After the predetermined error diffusion processing by the error diffusion processors 590a to 590c, the pixels are processed by an array processor 590g such that the main scanning directions of the plurality of the pixels are conformed to each other.

Thus, as explained above, the respective sections (filtering section 50, γ correcting section 51, gradation processor 52) of the image processor 3 can perform only the simultaneous and parallel processing of the plurality of pixels in the raster form or only the simultaneous and parallel processing of the plurality of pixels in the non-raster form. Or, a part of the processing is performed by the simultaneous and parallel processing of the plurality of pixels in the raster form. Then, the residual processing is performed by the simultaneous and parallel processing of the plurality of pixels in the non-raster form. In this case, an image data converter 71 is provided in the image processor 3, so that image data may be arrayed (rearrangement of pixel order) to be described later with reference to FIG. 33. The image data converter 71 has the same structure as the input image converter 2 explained with reference to FIGS. 13 to 19. Also, the output image converter 4 has the same structure as the input image converter 2 explained with reference to FIGS. 13 to 19.

Next, the following will explain the image output section of FIG. 1.

Figure 30:
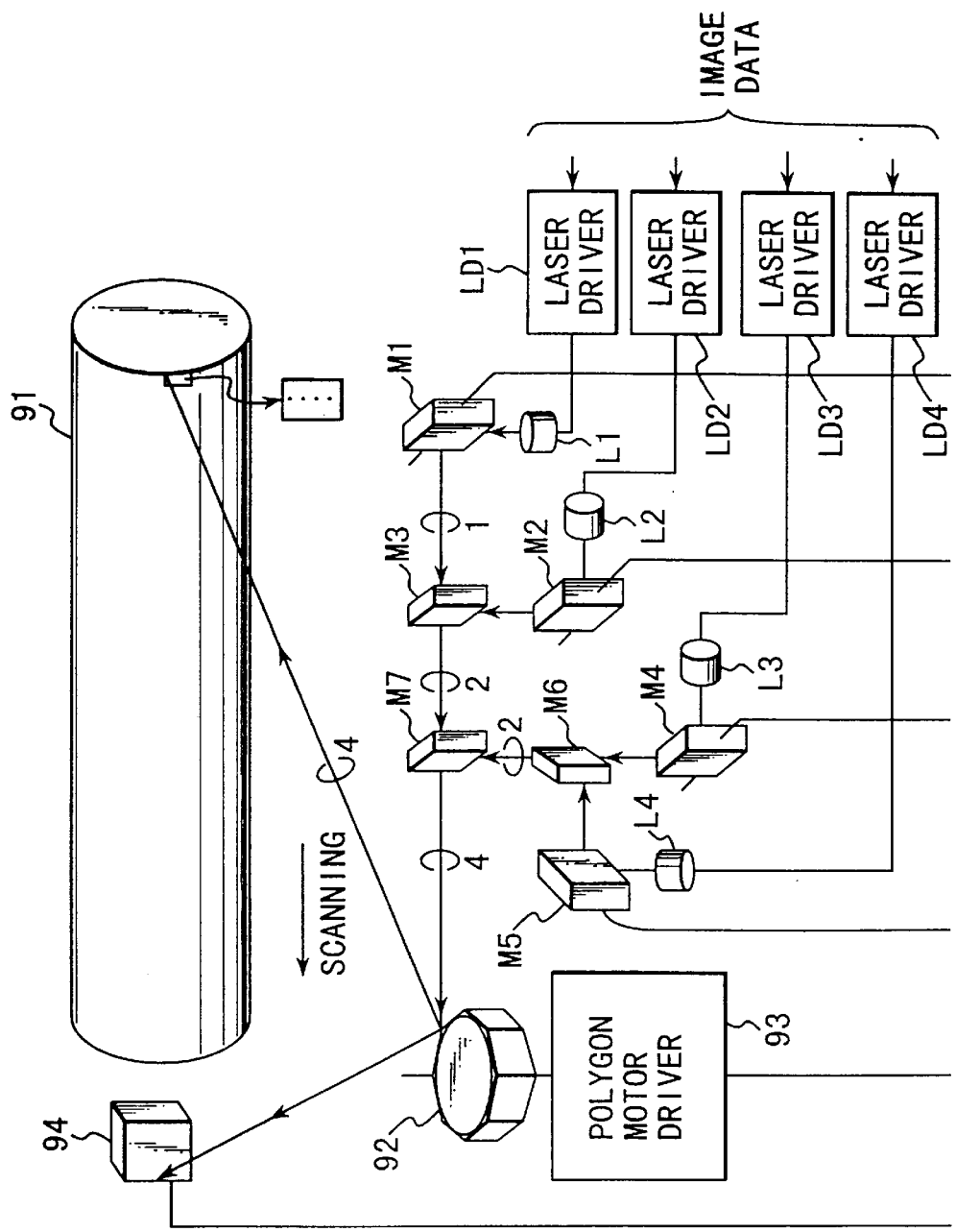
FIG. 30 is a view showing the structure of the main part of an image output section of a multi-beam form.

FIG. 30 shows the main part of the image output section 5 of the multi-beam output system for simultaneously writing the plurality of lines by use of a plurality of laser. The following will explain the case in which four line image data is simultaneously output at the simultaneously scanning of four laser beams.

Image data S3, which is output after being subjected to the predetermined image processing by the image processor, is converted to adjust to the processing form of the multi-beam output system by the output image converter 4 so as to be output as fourth data S4 of four line images. Lasers L1, L2, L3, and L4 are emitted through laser drivers LD1, LD2, LD3, and LD4 of FIG. 30.

The four laser beams emitted from the respective lasers L1 to L4 are synthesized by combining half mirrors M1 to M7. A photosensitive drum 91 is irradiated with the synthesized laser beam as the beam is horizontally scanned on four lines simultaneously by a polygon mirror 92 driven by a polygon motor driver 93. As a result, a latent image is formed on the drum 91. Then, the image is developed with toner to be transferred to paper to be recorded.

The synthesized laser beam is reflected by the polygon mirror, and the photosensitive drum 91 is irradiated with the laser beam, and the laser beam is received by a timing generator 94.

The timing generator 94 generates a horizontal synch signal (image data transmission timing per one scanning) for a laser beam irradiation. Image data S4 is transmitted to laser drivers LD1 to LD4 in synchronous with the horizontal synch signal. The photosensitive drum 91 is controlled to be rotated in synchronous with the horizontal synch signal.

Then, image data S4 of four lines to be supplied to the laser drivers LD1 to LD4 must be converted (arrayed) such that the scanning direction of the laser beam are conformed to the pixel position of the reproducing image by the output image converter 4. However, the structure is not always limited to the structure as shown in FIG. 1.

In consideration of the above point, the following will explain the other structure of the image forming device of the present invention.

Figure 31:
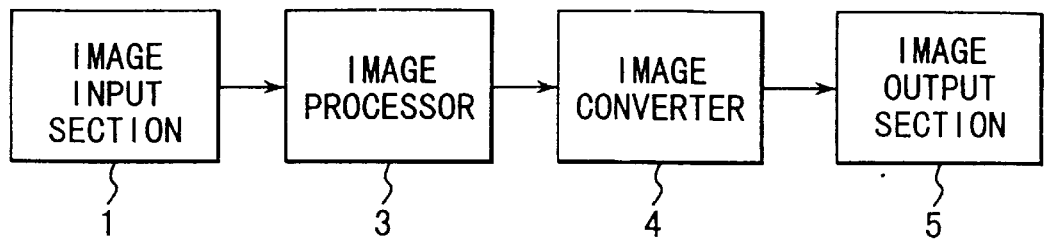
FIG. 31 is a view showing the other structure of the image forming device of the embodiment of the present invention.

In the image forming device of FIG. 31, for example, since the image input section 1 and the image processor 3 can adapt to the processing speed, no input image converter 2 is provided. In the case that the image output section 5 is to output the multi-beam, the output image converter 4 is provided between the image processor 3 and the image output section 5 to adapt to the high processing speed and the form of the processing. In FIG. 31, the image input section 1 outputs first image data S1 in the conventional raster form of one line, and the image processor 3 also has the conventional processing form of one pixel unit. After the image processing, image data is converted to the simultaneous output form of the plurality of lines by the image converter 4 from the raster form of one line, and the multi-beam output is performed by the image output section 5. This structure is the minimum structure necessary to the multi-beam output device.

Figure 32:
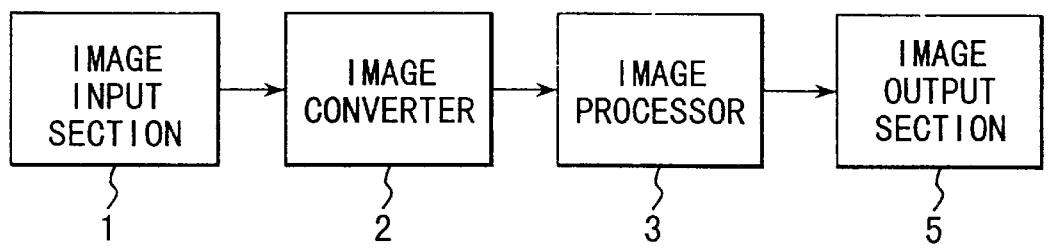
FIG. 32 is a view showing the other structure of the image forming device of the embodiment of the present invention.

FIG. 32 shows the other structure of the image forming device. The image input section 1 simultaneously outputs image data of the plurality of channels of the raster form as shown in FIGS. 5 and 7. Or, the image input section 1 outputs image data of the plurality of channels of the non-raster form, which is discontinuously arrayed in the main scanning direction as shown in FIGS. 9 and 11. The image converter 2 converts image data of the raster form to the non-raster form, or converts image data of the non-raster form to the raster form (FIGS. 15 to 19). The image processor 3 performs the parallel processing of the plurality of lines (FIGS. 20 to 27), so that the processing result is output with the multi-beam by the image output section 5. According to the above-mentioned structure, the input system, the image processing, and the output system can be performed at high speed. Regarding variations of the input/output characteristics every beam of the output system, the γ correcting section 51 changes the parameter of the corresponding image processing every line, so that the variations can be finely adjusted.

Figure 33:
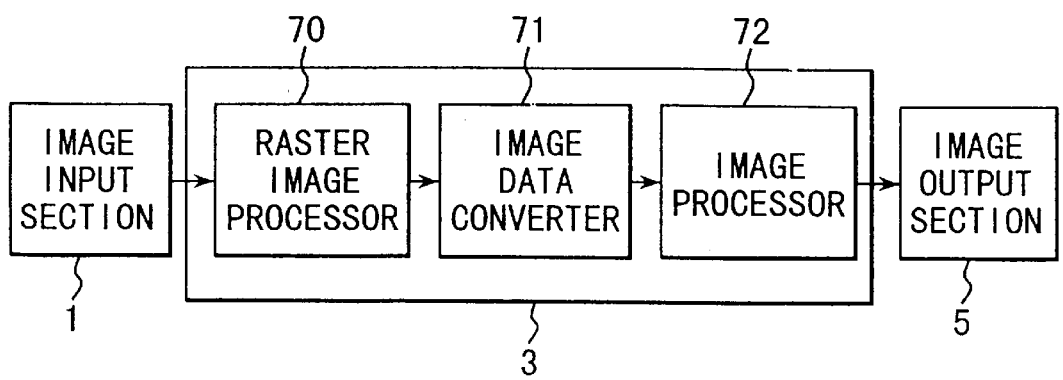
FIG. 33 is a view showing the other structure of the image forming device of the embodiment of the present invention

FIG. 33 shows the other structure of the image forming device. The image input section 1 simultaneously outputs the plurality of pixels continuing in the main scanning direction (FIGS. 5 to 12). The image processor 3 performs the part of the image processing (e.g., filtering processing) in the way of the parallel processing of the plurality of lines of the raster form. The other image processings (e.g., γ correction and gradation processing) are performed in the way of the parallel processing of the plurality of lines of the non-raster form (FIGS. 20 to 27). The result of the part of the processing performed in the raster form is converted to the non-raster form by an image data converter 71 (FIGS. 13 to 19). Thereafter, the processing is performed by the unit of the plurality of lines in the raster form, and the result is supplied to the multi-beam output system of the image output section 5.

The above-mentioned embodiments explained the cases in which three pixels were simultaneously processed, four pixels were simultaneously input, or output. However, this invention is not limited to these cases. According to the present invention, there can be provided an image forming apparatus in which images read from the document to be processed are simultaneously input in unit of various pixel numbers of pixels, a predetermined image processing is provided by the parallel processing in unit of various pixel numbers of pixels, so that the image to be duplicated is formed by the multi-beam output.

Thus, as explained above, according to the present invention, the image on the document is read by the image input section 1, the predetermined image processing is provided to the read image by the image processor 3 so as to generate third image data S3. Then, by the output image converter S4, the positions of the respective pixels of third image data S3 are rearranged such that third image data S3 is converted to fourth image data S4 of the plurality of lines. The image on the document to be copied is formed with the plurality of beams corresponding to image data of each line by the image output section 5 based on fourth image data S4 of the plurality of lines. Thereby, image data to be simultaneously input to the plurality of lines can be easily arrayed and adjusted to the multi-beam output.

Moreover, in accordance with the processing form of each stage of the image input section 1, the image processor 3, and the image output section 5, the input image converter 2 is provided between the image input section 1 and the image processor 3. Or, the output image converter 4 is provided between the image processor 3 and the image output section 5. Or, the image data converter 71 is provided in the image processor 3. Thereby, the image forming device can easily adapt to the processing speed of each device and the processing form, and the image processing for forming the duplicating image with high quality can be performed at high speed.

Moreover, each image data of the plurality of lines is corrected by the γ correcting section 51 in accordance with the characteristic of each beam of the image output section. Thereby, the fine adjustment for absorbing the variations between the beams can be performed.

Furthermore, each image data of the plurality of lines is delayed by at least one pixel or more by the gradation processor 52 of the image processor. Thereby, the error diffusion processing can be provided to image data of the plurality of liens in parallel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An image forming device comprising:

reading means for reading an image on an original document in a main scanning direction and a sub-scanning direction orthogonal to the main scanning direction, the reading means having first and second line sensors for dividing data read in a main scanning region which corresponds to one line into two portions and simultaneously outputting divided data by individually assigning it to a plurality of channels, each of the first and second line sensors being adapted to sequentially output pixel data composing image data read in the main scanning direction, starting from pixel data of a pixel at one end in the main scanning direction;

first converting means for rearranging pixels in image data that is assigned to the plurality of channels and simultaneously output from the reading means and outputting sequentially in the main scanning direction image data corresponding to the one line;

second converting means for converting image data that is arranged in the main scanning direction and is supplied from the first converting means to simultaneously output pixel data corresponding to a plurality of pixels in the sub-scanning direction;

image processing means, having a plurality of image processing sections that are arranged in parallel, for performing parallel image processing of the pixel data corresponding to the plurality of pixels that is simultaneously output from the second converting means and outputting image data corresponding to a plurality of lines; and image outputting means for simultaneously outputting a plurality of beams each corresponding to image data of one line of the plurality of lines output from the image processing means.

2. A device according to claim 1, wherein the image processing means includes filtering means for filtering a target pixel in the read image by multiplying peripheral pixels adjacent to the target pixel by a predetermined filter coefficient and adding all multiplication results.

3. A device according to claim 1, wherein the image processing means includes γ correcting means for correcting a non-linear characteristic between input and output signals of the device.

4. A device according to claim 1, wherein the image processing means includes error diffusion means for diffusing a binary conversion error, generated when making a target pixel binary, using peripheral pixels adjacent to the target pixel.

5. An image forming method comprising:

a reading step of reading an image on an original document in a main scanning direction and a sub-scanning direction orthogonal to the main scanning direction by use of first and second line sensors arranged in line with each other, said first and second line sensors dividing image data which is read in the main scanning direction and corresponds to one line and simultaneously outputting the divided data by individually assigning it to a plurality of channels, wherein each of the first and second line sensors sequentially outputs pixel data composing the data read in the main scanning direction, starting from pixel data of a pixel at one end in the main scanning direction;

a first converting step of rearranging pixels in image data that is assigned to the plurality of channels and simultaneously output at the reading step, and outputting sequentially in the main scanning direction image data corresponding to the one line;

a second converting step of converting image data that is arranged in the main scanning direction and is supplied at the first converting step to simultaneously output pixel data corresponding to a plurality of pixels in the sub-scanning direction;

a processing step of performing, by use of a plurality of image processing sections arranged in parallel, parallel image processing of the pixel data corresponding to the plurality of pixels that are simultaneously output at the second converting step, and outputting image data corresponding to a plurality of lines; and an image outputting step of simultaneously outputting a plurality of beams each corresponding to image data of one of the plurality of lines output at the processing step.

* * * * *